(12) United States Patent
Rubinski et al.

(10) Patent No.: US 10,578,503 B2
(45) Date of Patent: Mar. 3, 2020

(54) SYSTEM AND METHODS FOR STRAIN DETECTION IN A COUPLING

(71) Applicant: Swagelok Company, Solon, OH (US)

(72) Inventors: Jeffrey Michael Rubinski, Novelty, OH (US); Peter C. Williams, Cleveland Heights, OH (US); Kevin Nieman, Avon, OH (US); Cal R. Brown, Lyndhurst, OH (US); Christina Semkow, University Heights, OH (US); Michael Rossiter, Auburn Township, OH (US); Andrew Creque, Macedonia, OH (US); William Ponikvar, Sagamore Hills, OH (US); Matthew K. Messer, Mentor, OH (US); Charles W. Hayes, II, Wickliffe, OH (US); Sunniva R. Collins, Cleveland Heights, OH (US); Timothy Garrett Gray, Painesville, OH (US)

(73) Assignee: Swagelok Company, Solon, OH (US)

( * ) Notice: Subject to any disclaimer, the term of this patent is extended or adjusted under 35 U.S.C. 154(b) by 552 days.

(21) Appl. No.: 15/060,841

(22) Filed: Mar. 4, 2016

(65) Prior Publication Data
US 2016/0273687 A1 Sep. 22, 2016

Related U.S. Application Data

(60) Provisional application No. 62/177,084, filed on Mar. 6, 2015.

(51) Int. Cl.
*G01L 5/24* (2006.01)
*F16L 19/10* (2006.01)
*G01L 1/22* (2006.01)

(52) U.S. Cl.
CPC .............. *G01L 5/24* (2013.01); *F16L 19/103* (2013.01); *F16L 2201/10* (2013.01); *G01L 1/22* (2013.01); *G01L 1/2231* (2013.01)

(58) Field of Classification Search
CPC .................................. G01L 5/24; F16L 19/103
(Continued)

(56) References Cited

U.S. PATENT DOCUMENTS

| 3,873,102 A | 3/1975 | Lotze et al. |
| 4,915,427 A | 4/1990 | Zahuranec |

(Continued)

FOREIGN PATENT DOCUMENTS

| CN | 103245750 | 8/2013 |
| DE | 841091 | 6/1952 |

(Continued)

OTHER PUBLICATIONS

International Search Report and Written Opinion from PCT/US08/068145 dated Oct. 2, 2008.
(Continued)

*Primary Examiner* — Anna M Momper
*Assistant Examiner* — Fannie C Kee
(74) *Attorney, Agent, or Firm* — Calfee, Halter & Griswold LLP

(57) ABSTRACT

A fitting for a fluid conduit includes a coupling body, a coupling nut, a conduit gripping device that is axially driven by the coupling body and the coupling nut to provide grip and seal against a conduit, and a strain sensor unit disposed on a neck portion of the coupling body, the strain sensor unit including at least a first axially extending strain sensor positioned and oriented for strain sensor unit measurement of a first strain of the neck portion corresponding with a first fitting assembly condition, and a second strain of the neck (Continued)

portion corresponding with a second fitting assembly condition different from the first fitting assembly condition.

14 Claims, 25 Drawing Sheets

(58) Field of Classification Search
USPC .................... 285/93, 354, 386–387, 389
See application file for complete search history.

(56) References Cited

U.S. PATENT DOCUMENTS

| | | | |
|---|---|---|---|
| 5,528,935 | A | 6/1996 | Welch et al. |
| 5,529,346 | A | 6/1996 | Sperring |
| 5,714,680 | A | 2/1998 | Taylor et al. |
| 5,831,149 | A | 11/1998 | Webb |
| 6,250,686 | B1 | 6/2001 | Becker et al. |
| 6,438,814 | B1 | 8/2002 | Seymour et al. |
| 6,578,422 | B2 | 6/2003 | Lam et al. |
| 6,629,708 | B2 | 10/2003 | Williams |
| 6,688,650 | B2 | 2/2004 | Novotny |
| 6,868,731 | B1 | 3/2005 | Getesman |
| 6,951,137 | B2 | 10/2005 | Smith et al. |
| 7,111,688 | B2 | 9/2006 | vanBilderbeek |
| 7,209,047 | B2 | 4/2007 | Newberg |
| 7,284,433 | B2 | 10/2007 | Ales et al. |
| 7,581,445 | B2 | 9/2009 | Ales et al. |
| 7,591,181 | B2 | 9/2009 | Ales et al. |
| 7,661,196 | B1 | 2/2010 | Kipnes |
| 8,024,979 | B2 | 9/2011 | Clarke |
| 8,876,170 | B2 | 11/2014 | Arstein |
| 9,400,070 | B2 | 7/2016 | Anton et al. |
| 2004/0036273 | A1 | 2/2004 | McClary |
| 2005/0242582 | A1 | 11/2005 | Williams et al. |
| 2005/0252300 | A1 | 11/2005 | Miller et al. |
| 2006/0070451 | A1 | 4/2006 | Walsh et al. |
| 2006/0113510 | A1 | 6/2006 | Luo et al. |
| 2006/0225511 | A1 | 10/2006 | Burmann |
| 2007/0114021 | A1 | 5/2007 | Brown et al. |
| 2008/0041165 | A1 | 2/2008 | Coffey et al. |
| 2010/0133812 | A1 | 6/2010 | Williams et al. |
| 2010/0201118 | A1 | 8/2010 | Anton |
| 2011/0199220 | A1 | 8/2011 | McAlister |
| 2012/0005878 | A1 | 1/2012 | Rubinski et al. |
| 2012/0180877 | A1 | 7/2012 | Pallais |
| 2015/0292996 | A1 | 10/2015 | Hsieh |
| 2015/0345677 | A1 | 12/2015 | Colman |

FOREIGN PATENT DOCUMENTS

| | | |
|---|---|---|
| GB | 2329023 | 3/1999 |
| GB | 2353342 | 2/2001 |
| JP | 62-002091 | 1/1987 |
| JP | 63-308290 | 12/1988 |
| JP | 06-221885 | 8/1994 |
| JP | 6-87858 | 12/1994 |
| JP | 11-316000 | 11/1999 |
| JP | 2000-161548 | 6/2000 |
| JP | 2001108181 | 4/2001 |
| JP | 2001294143 | 10/2001 |
| JP | 2002236064 | 8/2002 |
| JP | 2002267051 | 9/2002 |
| JP | 2005003038 | 1/2005 |
| JP | 2005299701 | 10/2005 |
| JP | 2006-207795 | 8/2006 |
| WO | 01/073333 | 10/2001 |
| WO | 02/033371 | 4/2002 |
| WO | 0/002576 | 1/2007 |
| WO | 09/028283 | 3/2009 |

OTHER PUBLICATIONS

International Search Report and Written Opinion from PCT/US08/068147 dated Dec. 3, 2008.

Search Report from European Application No. 16762196.0 dated Sep. 10, 2018.

Office action from Chinese Application No. 201680014081.8 dated Jan. 29, 2019.

Office action from U.S. Appl. No. 16/383,912 dated Nov. 25, 2019.

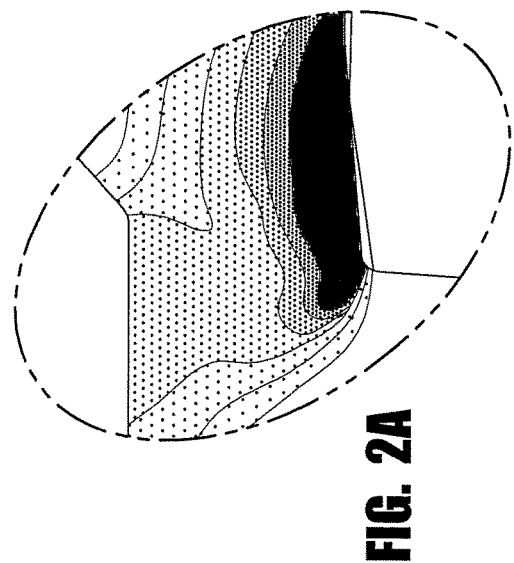
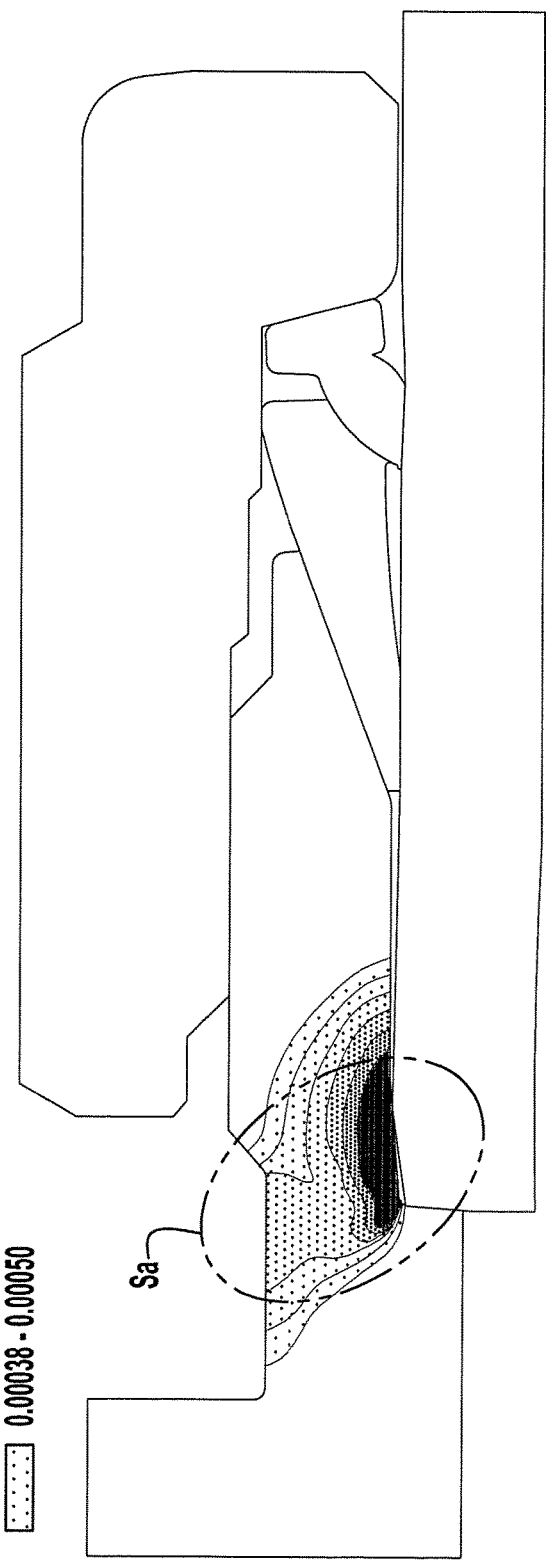
FIG. 2A
FIG. 2

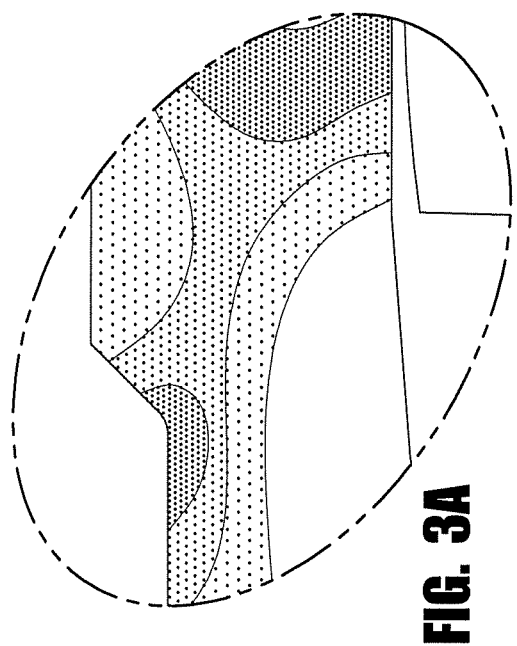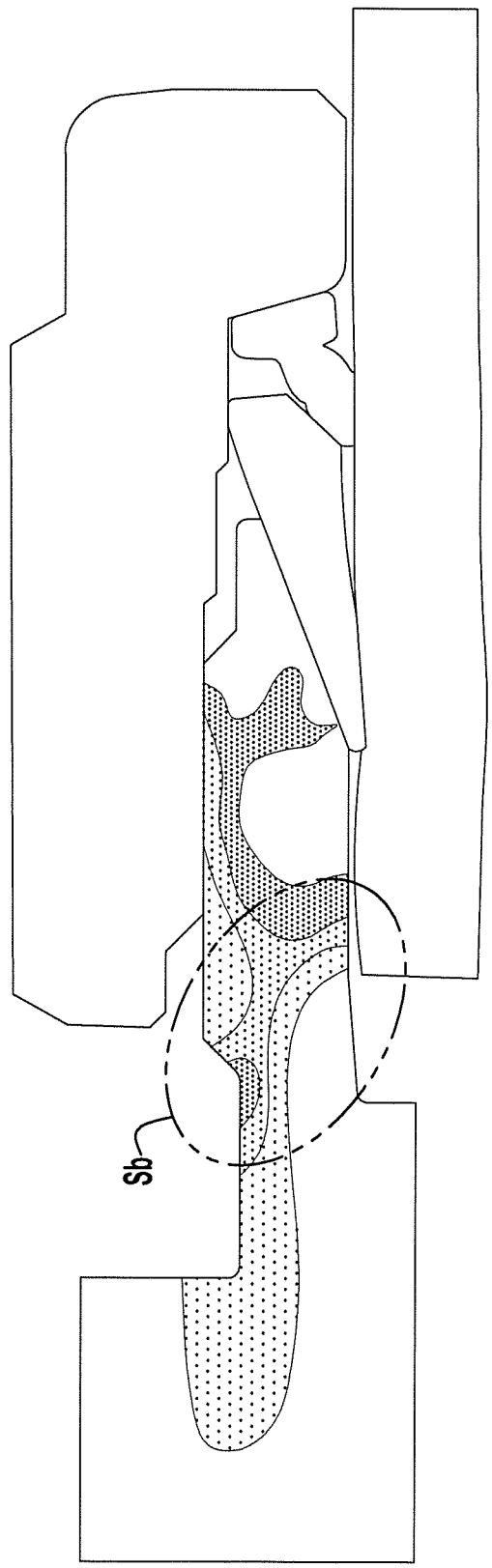
FIG. 3A
FIG. 3

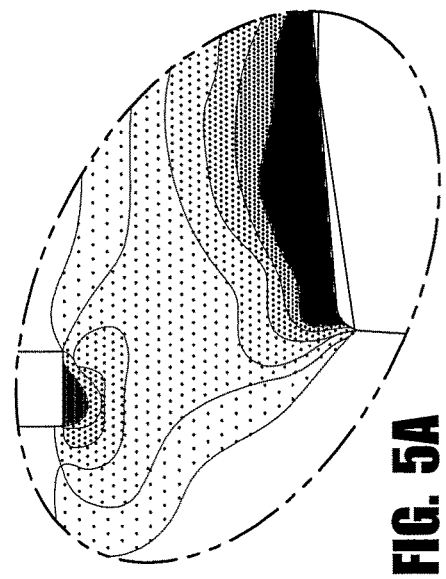
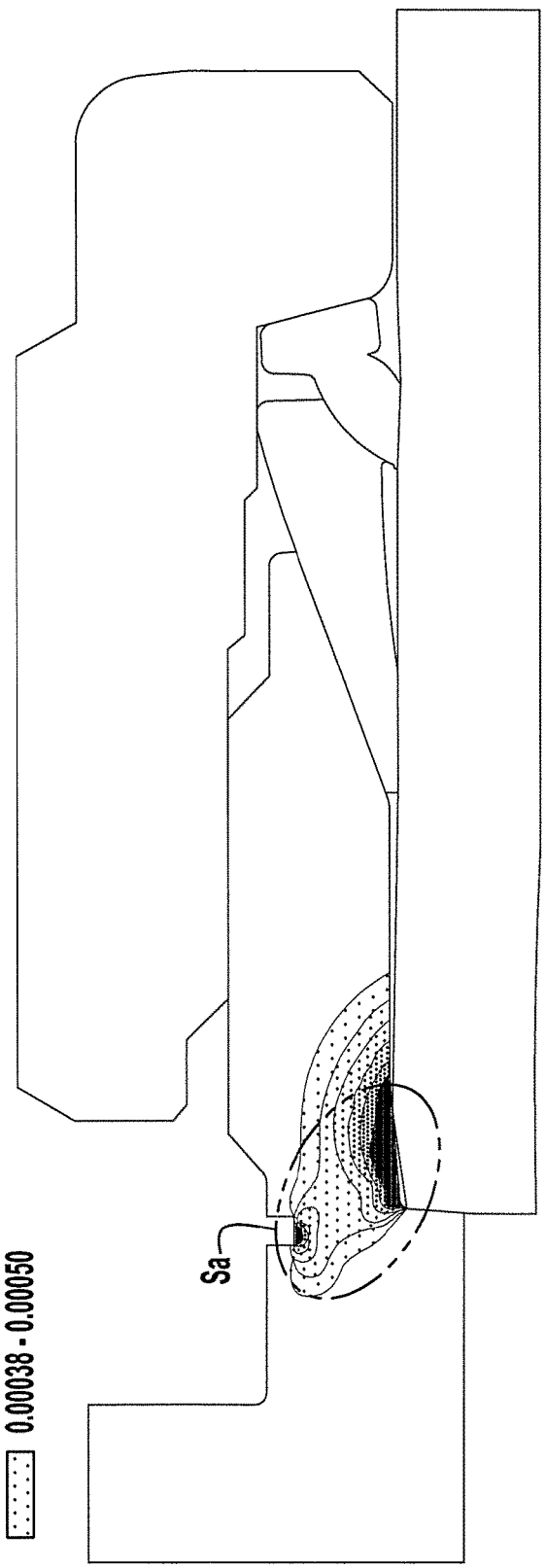
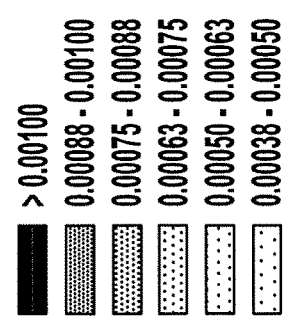

- -0.00012 - 0.00000
- -0.00025 - -0.00012
- -0.00050 - -0.00025
- < -0.00050

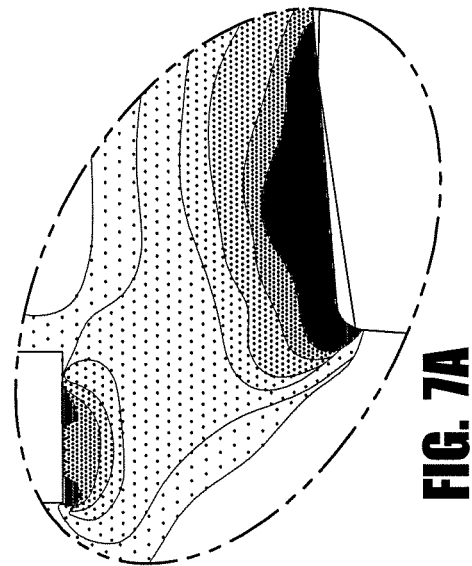
FIG. 7A
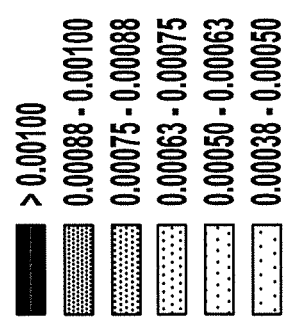
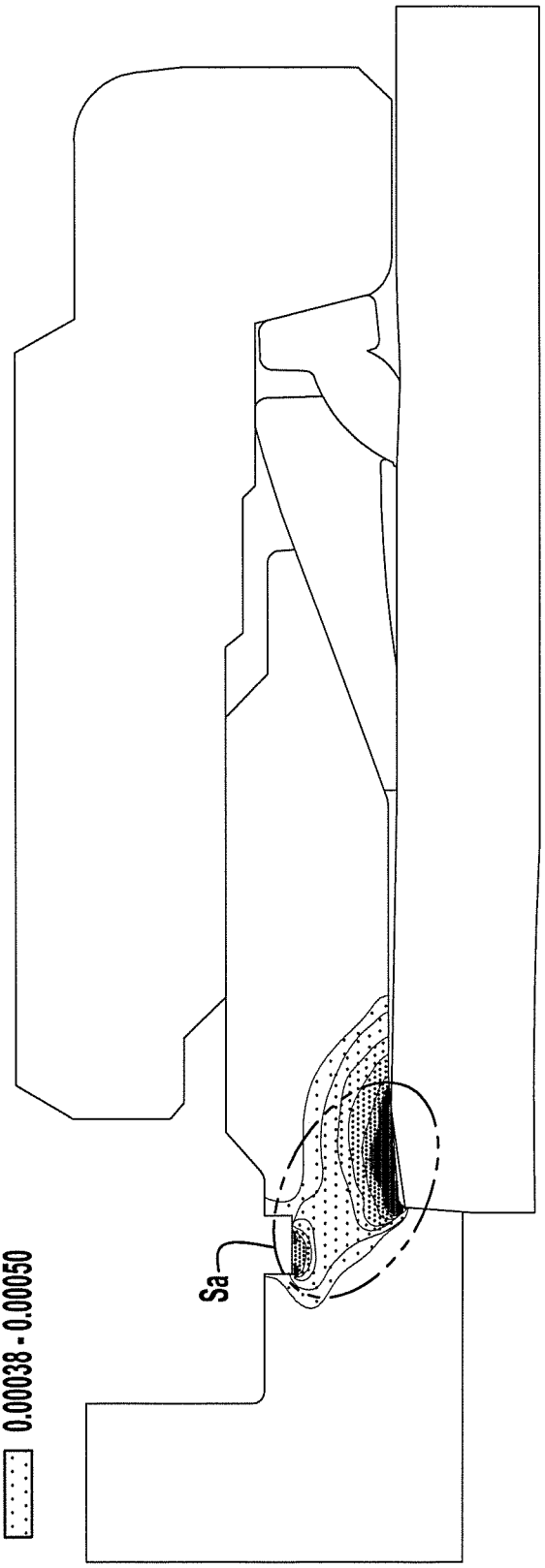
FIG. 7

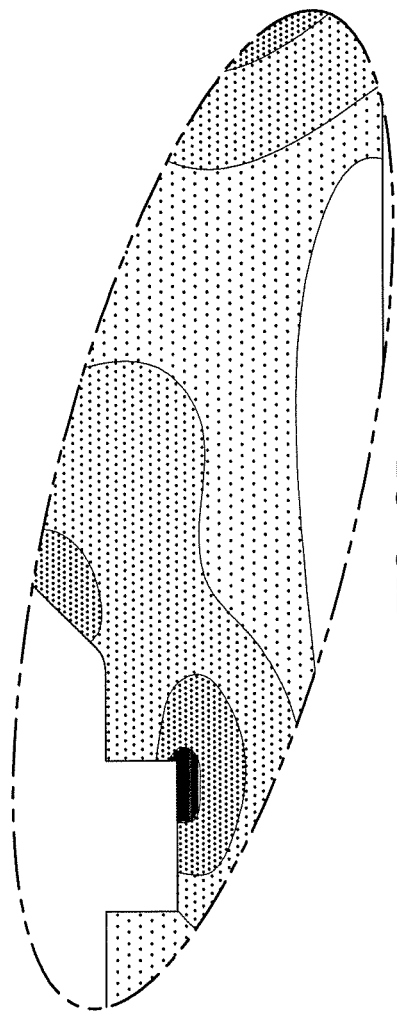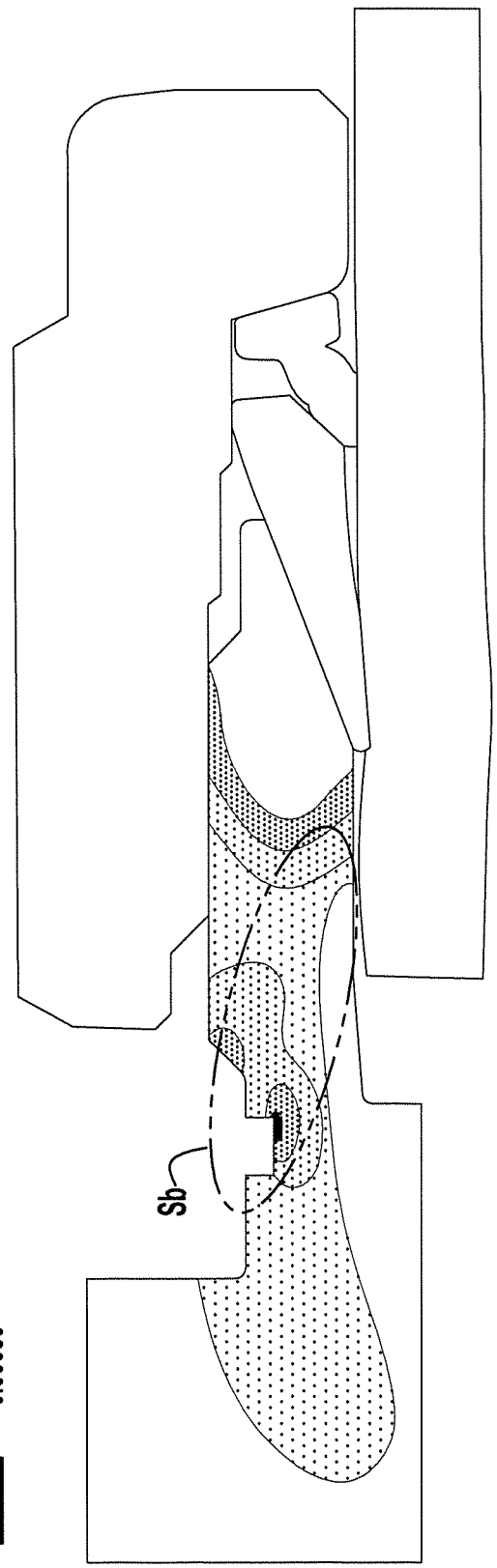

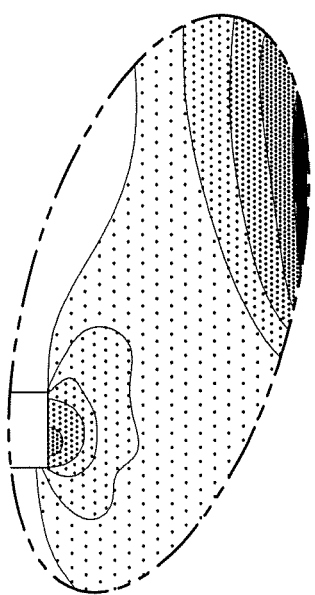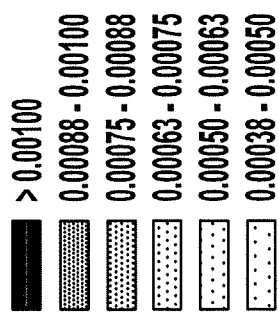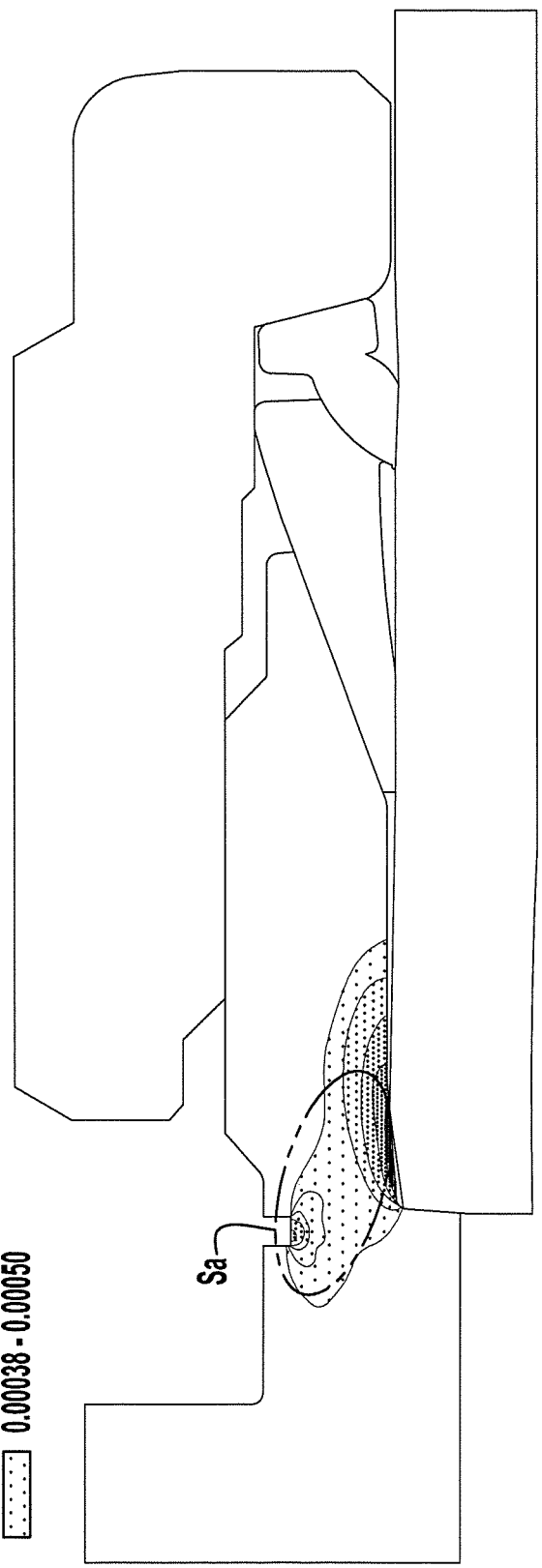

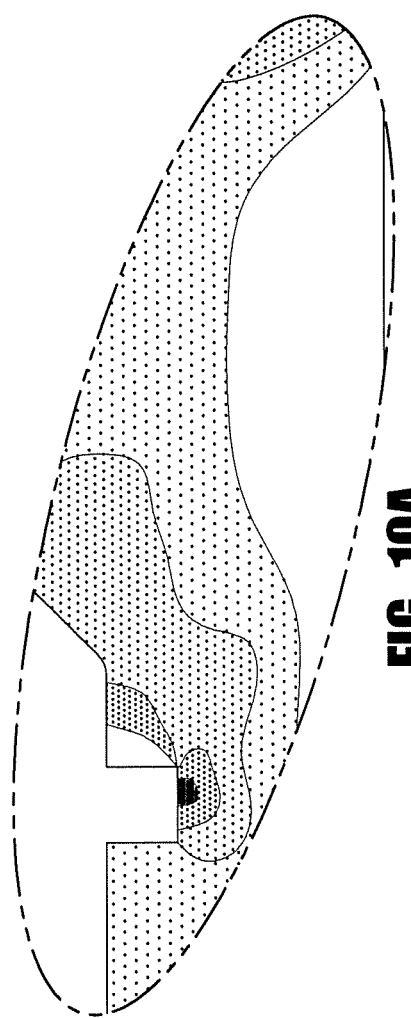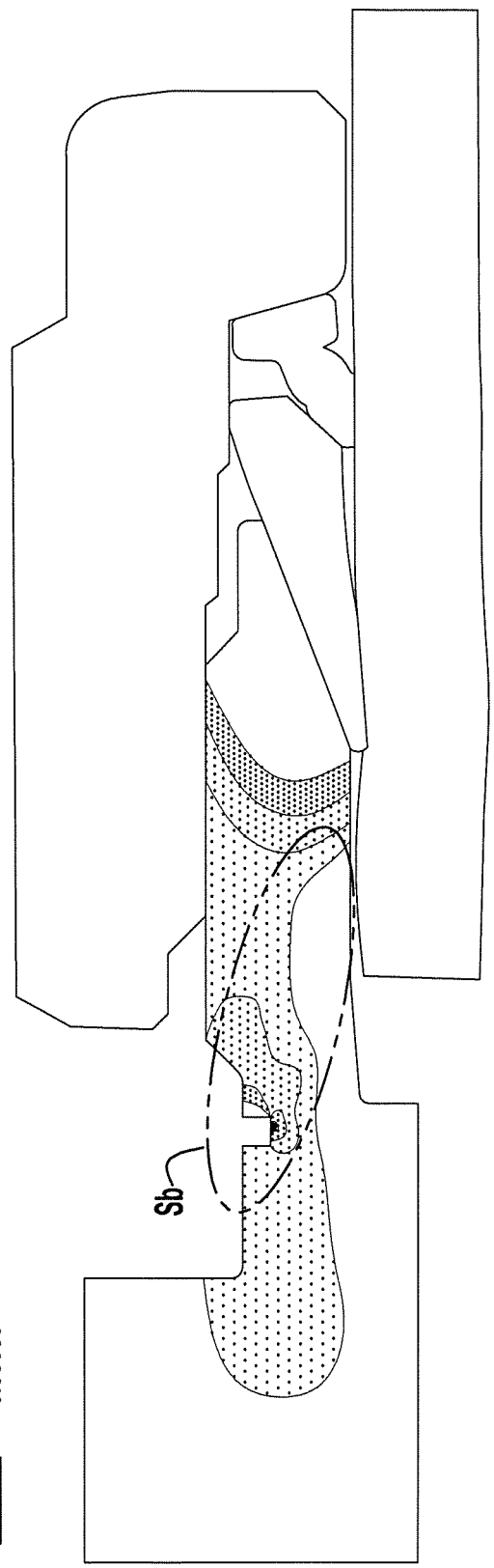

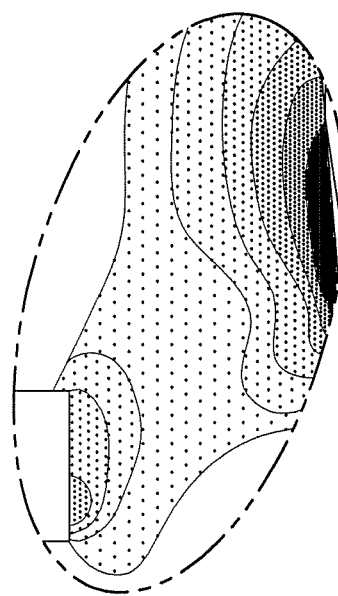
FIG. 11A
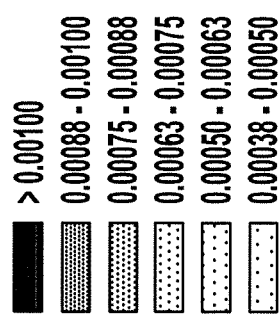
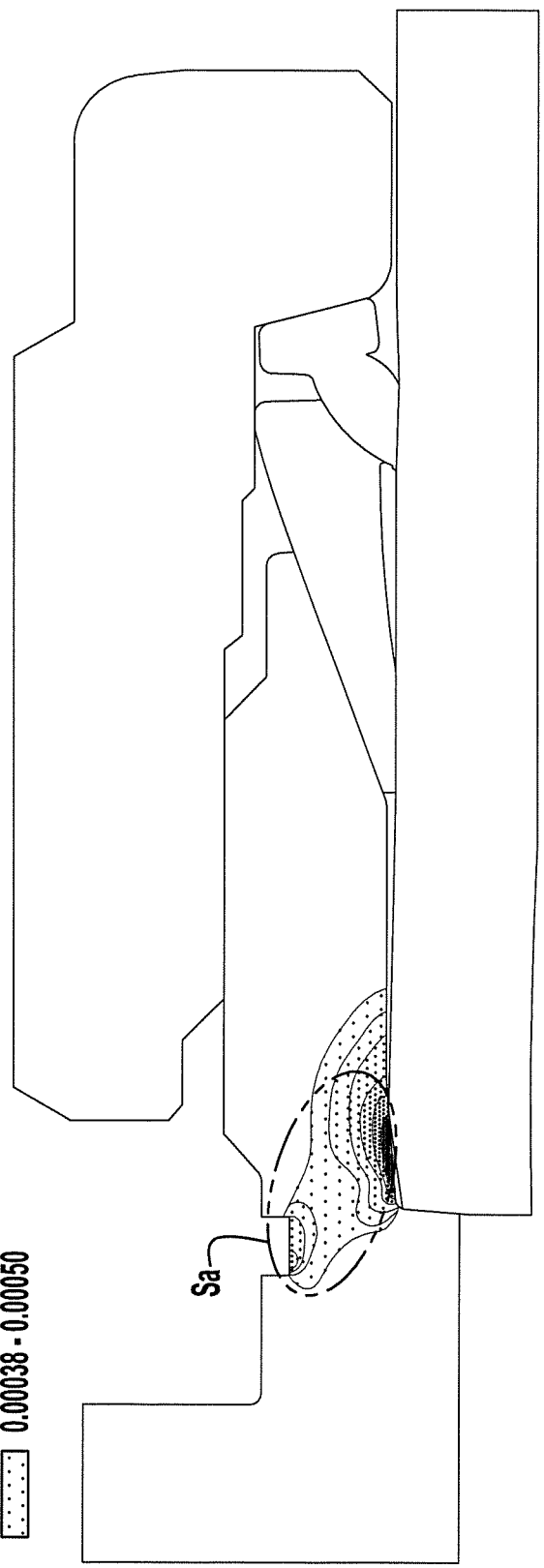
FIG. 11

| | LEFT EDGE (IN) | RIGHT EDGE (IN) | AXIAL DIFF (IN) | | LEFT EDGE (IN) | RIGHT EDGE (IN) | AXIAL DIFF (IN) |
|---|---|---|---|---|---|---|---|
| .01" NOTCH UN-BOTTOMED .065" WALL TUBE | | | | .02" NOTCH UN-BOTTOMED .065" WALL TUBE | | | |
| FINGER - TIGHT | 0.490776 | 0.480776 | 0.01 | FINGER - TIGHT | 0.500776 | 0.480776 | 0.02 |
| 1-1/4 TPFT | 0.490718 | 0.48074 | 0.009978 | 1-1/4 TPFT | 0.500714 | 0.480739 | 0.019975 |
| Δ DIFF (IN) | | | -2.2E-05 | Δ DIFF (IN) | | | -2.2E-05 |
| μ - STRAIN | | | -2200 | μ - STRAIN | | | -1250 |
| .01" NOTCH BOTTOMED .065" TUBE WALL | | | | .02" NOTCH BOTTOMED .065" TUBE WALL | | | |
| FINGER - TIGHT | 0.490776 | 0.480776 | 0.01 | FINGER - TIGHT | 0.500776 | 0.480776 | 0.02 |
| 1-1/4 TPFT | 0.490837 | 0.480792 | 0.010045 | 1-1/4 TPFT | 0.500844 | 0.480792 | 0.020052 |
| Δ DIFF (IN) | | | 4.5E-05 | Δ DIFF (IN) | | | 5.2E-05 |
| μ - STRAIN | | | 4500 | μ - STRAIN | | | 2600 |
| .01" NOTCH UN-BOTTOMED .035" TUBE WALL | | | | .02" NOTCH UN-BOTTOMED .035" TUBE WALL | | | |
| FINGER - TIGHT | 0.490776 | 0.480776 | 0.01 | FINGER - TIGHT | 0.500776 | 0.480776 | 0.02 |
| 1-1/4 TPFT | 0.49073 | 0.480747 | 0.009983 | 1-1/4 TPFT | 0.500729 | 0.480747 | 0.019982 |
| Δ DIFF (IN) | | | -1.7E-05 | Δ DIFF (IN) | | | -1.8E-05 |
| μ - STRAIN | | | -1700 | μ - STRAIN | | | -900 |
| .01" NOTCH BOTTOMED .035" TUBE WALL | | | | .02" NOTCH BOTTOMED .035" TUBE WALL | | | |
| FINGER - TIGHT | 0.490776 | 0.480776 | 0.01 | FINGER - TIGHT | 0.500776 | 0.480776 | 0.02 |
| 1-1/4 TPFT | 0.490819 | 0.480788 | 0.010031 | 1-1/4 TPFT | 0.500825 | 0.480788 | 0.020037 |
| Δ DIFF (IN) | | | 3.1E-05 | Δ DIFF (IN) | | | 3.7E-05 |
| μ - STRAIN | | | 3100 | μ - STRAIN | | | 1850 |

FIG. 14

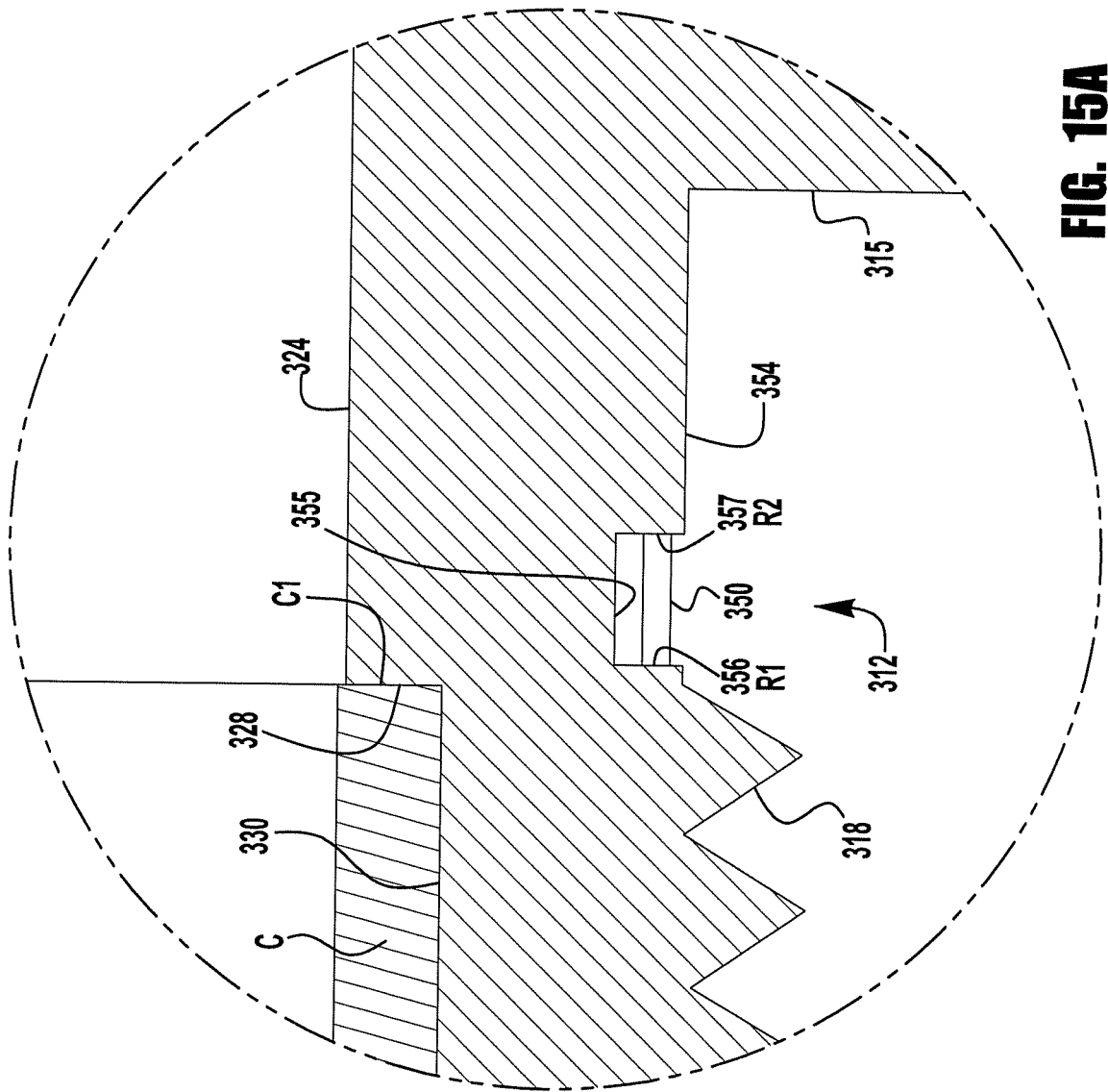

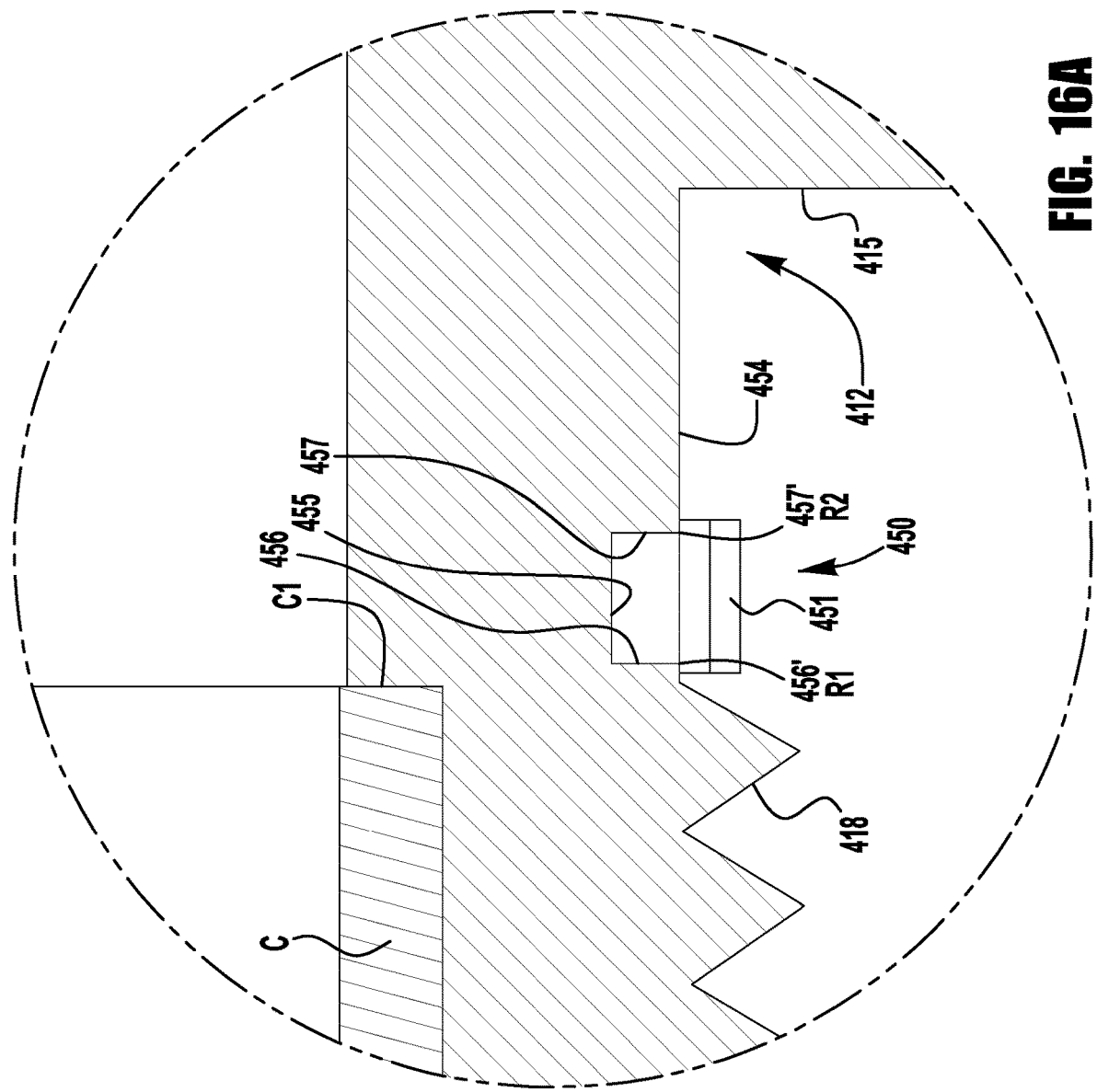

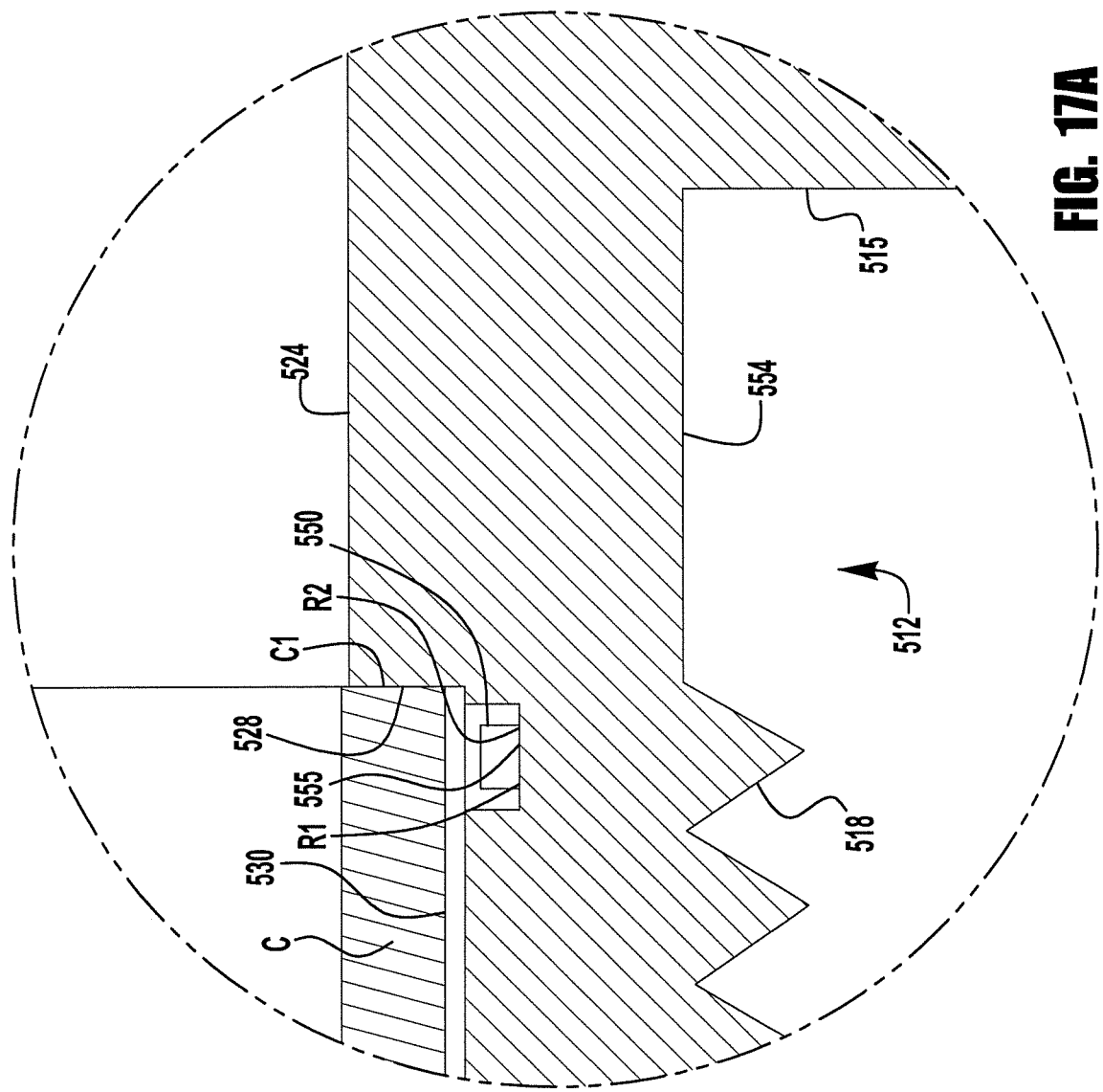

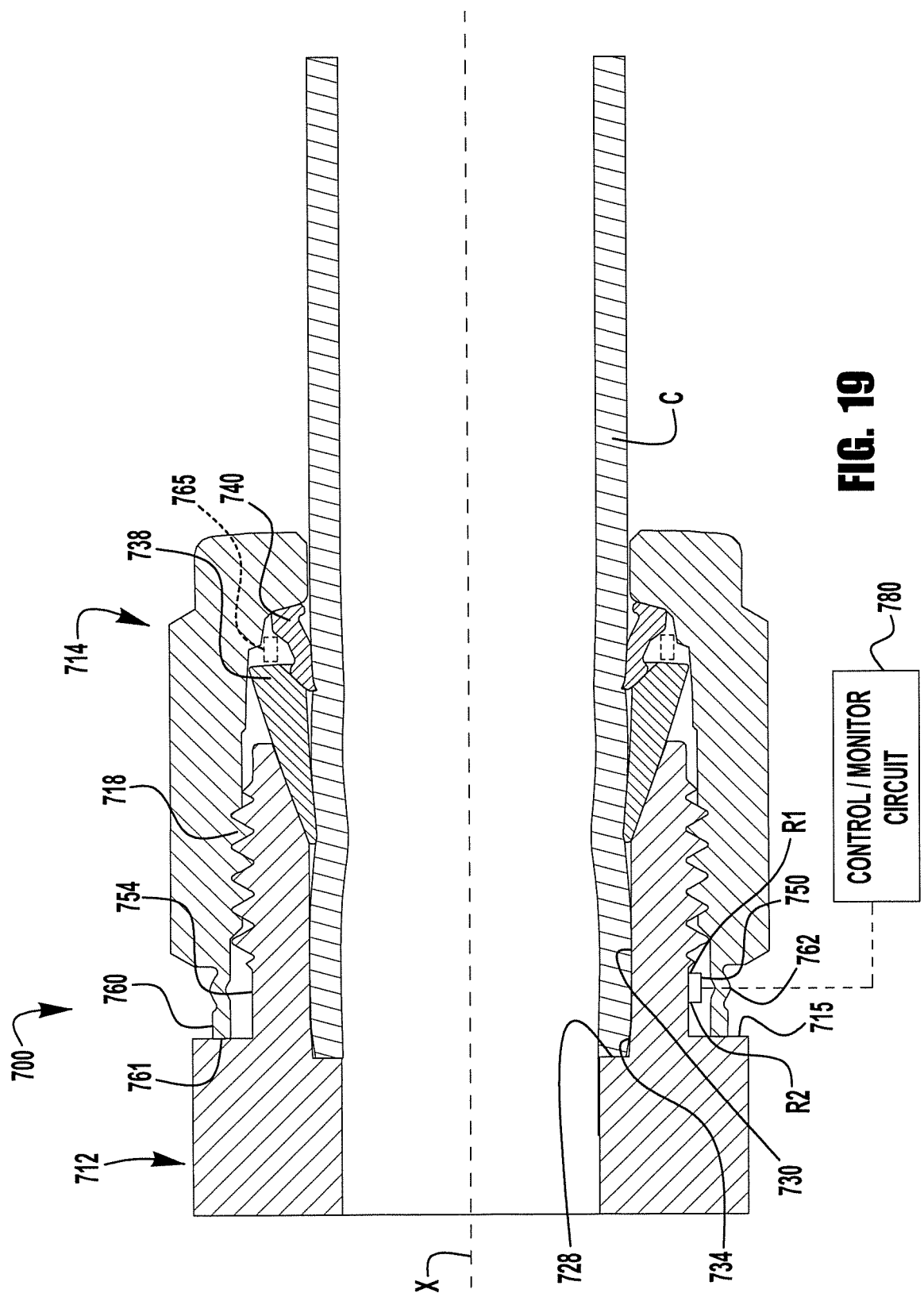

SYSTEM AND METHODS FOR STRAIN DETECTION IN A COUPLING

RELATED APPLICATIONS

This application claims priority to U.S. Provisional Application Ser. No. 62/177,084, filed on Mar. 6, 2015, titled SYSTEMS AND METHODS FOR STRAIN DETECTION IN A COUPLING, the entire disclosure of which is incorporated by reference herein.

BACKGROUND OF THE DISCLOSURE

The present disclosure relates to mechanically attached connections such as fittings, joints, couplings, unions and so on that are used in fluid systems or fluid circuits to contain fluid flow and fluid pressure. Such mechanically attached connections may be used with but are not limited to conduit fittings for tube, pipe or any other type of conduit, and that connect a conduit end to either another conduit end or to another portion, element or component of a fluid system. For simplicity and clarity, the term 'fitting' as used herein is intended to be all inclusive of other terms, for example coupling, connection, union, joint and so on, that could alternatively be used to refer to a mechanically attached connection. Such mechanically attached connections are characterized by a fluid tight seal and mechanical strength to hold the connection together including sufficient grip of the conduit under vibration, stress and pressure. Fluids may include gas, liquid, slurries and any variation or combination thereof.

Fluid systems and circuits typically use mechanically attached connections to interconnect conduit ends to each other and to flow devices which may control flow, contain flow, regulate flow, measure one or more characteristics of the fluid or fluid flow, or otherwise influence the fluid within the fluid system. Fluid systems are found everywhere, from the simplest residential plumbing system, to the most complex fluid systems for the petrochemical, semiconductor, biopharmaceutical, medical, food, commercial, residential, manufacturing, analytical instrumentation and transportation industries to name just a few examples. Complex systems may include thousands of fittings, either fittings being installed as a new installation or as part of repair, maintenance or retrofit operations, or fittings that were previously installed.

The term 'mechanically attached connection' as used herein means any connection for or in a fluid system that involves at least one connection that is held in place by mechanically applied force, stress, pressure, torque, or the like, such as, for example, a threaded connection, a clamped connection, a bolted or screwed connection and so on. This is distinguished from a metallurgical or chemical connection most commonly practiced as welding, brazing, soldering, adhesive and so forth. A mechanically attached connection may include a combination of mechanical and metallurgical connections, and often does, and such connections are also within the term 'mechanically attached connections' as they include at least one such connection.

SUMMARY OF THE DISCLOSURE

In accordance with an inventive aspect of the disclosure, a fitting is provided with a mechanism for detecting strain in a portion of the fitting to determine a related condition of the fitting assembly, such as, for example, axial strain in a neck portion of the fitting body indicative of a first fitting assembly condition (e.g., sufficient pull-up of the fitting and/or pull-up of the fitting on a conduit end bottomed against a conduit socket in the fitting body), or axial strain in a neck portion of the fitting body indicative of a second fitting assembly condition (e.g., insufficient pull-up of the fitting and/or pull-up of the fitting on a conduit end un-bottomed within the conduit socket of the fitting body).

Accordingly, in an exemplary embodiment, a fitting is provided with a mechanism for detecting axial displacement of a first reference location on a neck portion of the fitting body with respect to a second reference location on the neck portion to determine whether the fitting is in a first fitting assembly condition or a second fitting assembly condition.

In accordance with another inventive aspect of the disclosure, a fitting, or one or more components of a fitting, is provided with electrical, electro-magnetic or electronic capability such as for example in the form of a sensor or other device that facilitates utility of the fitting, including, but not limited to, fitting installation and assembly, monitoring of fitting performance, and any other type of information that may be useful to a manufacturer, installer or end user. The present disclosure further contemplates associated methods of including such capability in a fitting or fitting components as well as methods associated with the use of such fittings.

BRIEF DESCRIPTION OF THE DRAWINGS

FIG. 2 illustrates a finite element analysis (FEA) simulation of an exemplary fitting installed on a conduit end bottomed against the fitting body conduit socket;

FIG. 2A illustrates an enlarged view of a body neck portion of the bottomed fitting assembly of FIG. 2;

FIG. 3 illustrates an FEA simulation of the fitting of FIG. 2 installed on an un-bottomed conduit end;

FIG. 3A is an enlarged view of a body neck portion of the un-bottomed fitting assembly of FIG. 3;

FIG. 5 illustrates a finite element analysis (FEA) simulation of an exemplary fitting having a notched body neck portion, installed on a conduit end bottomed against a counterbore of the fitting body conduit socket;

FIG. 5A illustrates an enlarged view of the body neck portion of the bottomed fitting assembly of FIG. 5;

FIG. 7 illustrates a finite element analysis (FEA) simulation of an exemplary fitting having a notched body neck portion, installed on a conduit end bottomed against a counterbore of the fitting body conduit socket;

FIG. 7A illustrates an enlarged view of the body neck portion of the bottomed fitting assembly of FIG. 7;

FIG. 8 illustrates an FEA simulation of the fitting of FIG. 7 installed on an un-bottomed conduit end;

FIG. 8A illustrates an enlarged view of the body neck portion of the un-bottomed fitting assembly of FIG. 8;

FIG. 9 illustrates a finite element analysis (FEA) simulation of an exemplary fitting having a notched body neck portion, installed on a conduit end bottomed against a counterbore of the fitting body conduit socket;

FIG. 9A illustrates an enlarged view of the body neck portion of the bottomed fitting assembly of FIG. 9;

FIG. 10 illustrates an FEA simulation of the fitting of FIG. 9 installed on an un-bottomed conduit end;

FIG. 10A illustrates an enlarged view of the body neck portion of the un-bottomed fitting assembly of FIG. 10;

FIG. 11 illustrates a finite element analysis (FEA) simulation of an exemplary fitting having a notched body neck portion, installed on a conduit end bottomed against a counterbore of the fitting body conduit socket;

FIG. 11A illustrates an enlarged view of the body neck portion of the bottomed fitting assembly of FIG. 11;

FIG. 14 is a chart identifying predictive axial strain parameters for fittings having notched fitting body neck portions, as installed with both bottomed and un-bottomed conduit ends;

FIG. 15A is an enlarged partial cross-sectional view of a body neck portion of the fitting assembly of FIG. 15;

FIG. 16A is an enlarged partial cross-sectional view of a body neck portion of the fitting assembly of FIG. 16;

FIG. 17A is an enlarged partial cross-sectional view of a body neck portion of the fitting assembly of FIG. 17;

FIG. 19 is a cross-sectional view of an exemplary embodiment of a fitting assembly incorporating one or more inventions disclosed herein, shown in a pulled-up condition.

DESCRIPTION OF THE EXEMPLARY EMBODIMENTS

Figure 1:
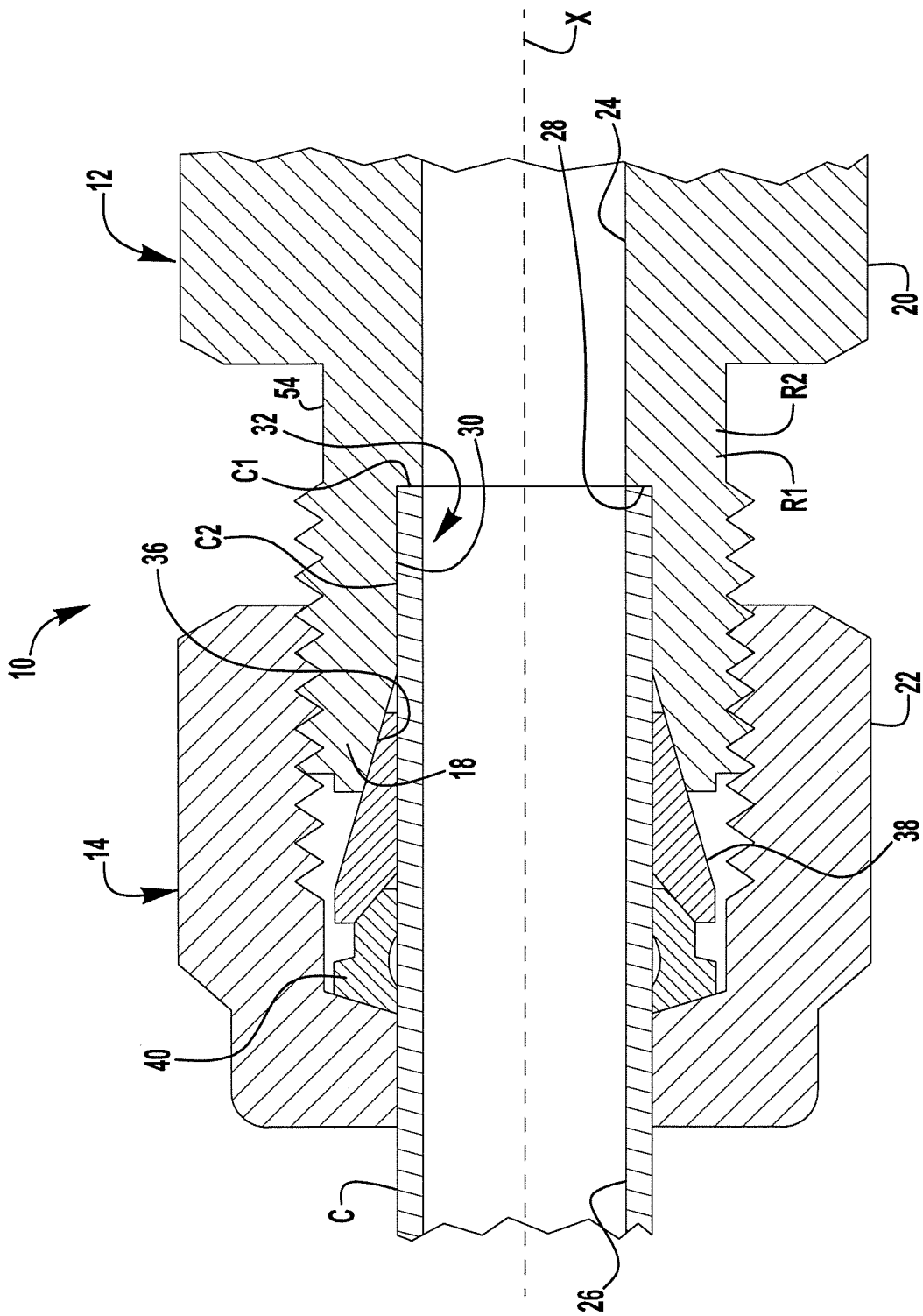
FIG. 1 is a cross-sectional view of an exemplary embodiment of a fitting, with the parts assembled in a finger tight condition.

Although the various embodiments are described herein with specific reference to a tube fitting, and more specifically to a tube fitting for stainless steel tubing, those skilled in the art will readily appreciate that the inventions herein may be used with any metal or non-metal conduit and any metal or non-metal fitting components, including but not limited to plastics, polymers and so on. Exemplary materials include various stainless steels, including, for example, 316 stainless steel, 304 stainless steel, AL-6XN stainless steel alloy, 254 SMO stainless steel alloy, Inconel® alloy 625 stainless steel, and Incoloy® alloy 825 stainless steel, as well as Hastelloy®, brass, titanium, and aluminum, to name a few examples. The inventions may also be used with thinner walled conduits or thicker walled conduits. Moreover, while the exemplary embodiments illustrate a connection between a conduit end and a particular type of fluid member (a coupling body), such illustration if for explanation purposes only and should not be construed in a limiting sense. The inventions herein may be used to connect a conduit end to any fluid member, such as but not limited to, another conduit end, a coupling component or member, a flow control member such as a valve, regulator, filter and so on. The terms finger tight, finger tight position and finger tight condition are used interchangeably herein and refer to the fitting components and conduit gripping devices being assembled onto the conduit to an axially abutting position where the conduit gripping devices are in axial contact with and between the male and female fitting components and with each other. In an example, the fitting components and conduit gripping devices are in axial contact with and between the male and female fitting components and with each other, but without any significant or forceful tightening of the male and female fitting components together, usually typified by the conduit gripping device or devices not undergoing plastic deformation; or in the case of remakes, not undergoing additional plastic deformation. By 'completed pulled-up condition' is meant that the fitting has been tightened onto a conduit end to complete a connection between the conduit end and another fluid member, with an established conduit grip and seal. Between finger tight and completed pulled-up condition may be intermediate or partial pull-up and assembly steps as the fitting is being tightened. The term 'partial pull-up' may also be understood to include what is often referred to in the art as pre-swaging, wherein a swaging tool is used to deform the ferrules onto the conduit sufficiently so that the ferrules and the nut are retained on the conduit prior to being mated with the second fitting component to form a fitting assembly. Also used herein is the term 'make-up' or a fitting that is 'made-up' which is similar to 'pull-up' in that the terms refer to the process of assembling and tightening the fitting onto a conduit end. Reference herein to a 'subassembly' or 'pre-assembly' of fitting parts, and derivatives of those terms, refers to two or more parts that may separately be assembled or joined and held together by any convenient arrangement or method as an integral or single unit to simplify final assembly of the fitting. The terms fluid system and fluid circuit are used somewhat interchangeably herein, with a fluid system generally referring to a more complex arrangement for fluid containment, whereas a fluid circuit may be as simple as a conduit connected to another fluid device by a mechanically attached connection. The present inventions are applicable to all different kinds of fluid systems and circuits regardless of the complexity.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The present disclosure relates in part to providing a mechanism for measuring axial strain on a neck portion of the fitting to determine a condition of the fitting, including, for example, amount of pull-up of the fitting on a conduit (e.g., full, partial, insufficient, or no pull-up), and pull-up of the fitting on a conduit that is bottomed against the conduit socket of the fitting body (e.g., against a counterbore of the conduit socket), or pull-up of the fitting on a conduit that is un-bottomed within the conduit socket of the fitting body. As used herein, 'measuring' or 'measurement' may include, for example, one or more of visual inspection, mechanical gauging, optical scanning, the reaction of a strain responsive coating or other such attachment, and/or the generation or receipt of electrical signals corresponding to a change in a sensed parameter that corresponds to axial strain.

The present disclosure also relates in part to providing a sensing function for a mechanically attached connection. As used herein, sensing function, and any embodiment of a sensing function in a 'sensor,' 'sensor unit, or sensor package,' is intended to be construed in its broadest context as the capability to, for example, but not limited to, sense, detect, measure, indicate, report, transmit, communicate, feedback or collect, or any combination thereof, information, condition, status, state or data relating to the fitting or assembly, one or more of the fitting or assembly components, members or parts, and/or the fluid contained by the fitting or assembly. The sensing function may be realized by a sensor unit that is either wetted or non-wetted or both. As used herein, 'wetted' refers to components that are in contact with system fluid during normal operation of the fluid control device, and 'non-wetted' refers to components that are not in contact with system fluid during normal operation of the fluid control device. For example, a sensor unit disposed on an external surface of a fitting would be considered a non-wetted component, even though fitting leakage may expose the sensor unit to contact with the leaking system fluid. In other embodiments, the sensing function may additionally or alternatively be realized by an external gauge or device that measures a condition of the fitting that corresponds to a status or state of the fitting.

With reference to FIG. 1, an exemplary fitting assembly 10 that may be used with one or more of the inventions is presented. The fitting assembly 10 is also referred to herein as a mechanically attached connection, conduit fitting, or tube fitting, but the term fitting is intended to be broadly construed as any arrangement by which a conduit C may be mechanically attached or connected to another fluid component. For reference purposes only, the conduit C has a longitudinal axis X, which may, but need not coincide with a longitudinal center line of the conduit. Reference herein to 'axial' movement or displacement and 'radial' movement or displacement is made with respect to the axis X.

The fitting assembly 10 may include a first coupling member 12 and a second coupling member 14. The coupling members 12, 14 may be any suitable arrangement by which the assembly 10 is installed with conduit grip and seal on the conduit end C. For the FIG. 1 embodiment, the first coupling member 12 may be realized in the form of a male threaded body, and the second coupling member 14 may be realized in the form of a female threaded nut. As used herein, a coupling member in the form of a 'body' receives the conduit end, typically but not necessarily in a conduit socket. A coupling member in the form of a 'nut' is joined to the body to tighten or pull-up the fitting to a made condition with proper conduit grip and seal, with the nut typically including a drive surface that engages a conduit gripping device (described in greater detail below) during pull-up or may alternatively engage a drive member that engages the gripping device. These components are 'coupling' in the sense that they can be joined together and tightened so as to install the assembly 10 onto the conduit end C so that the assembly 10 grips the conduit to prevent the conduit from loosening under any one or more environmental stresses such as temperature, pressure, strain and vibration to name a few examples. The assembly 10 also provides a seal against loss of fluid. The fluid that is carried by the conduit C may be gas, liquid, a combination thereof or any other fluid medium. The assembly 10 may find typical application in making connections within an overall fluid system. A fitting assembly such as the exemplary fitting 10 works within the fluid system to help contain the fluid, and in many cases must contain the fluid under various pressure requirements, as well as temperature and other environmental effects. It should also be noted that one or both of the coupling members may in practice be part of or integral with a fluid component, and not necessarily a discrete component as illustrated herein. For example, the body 12 may be integrated or associated with a valve body, a manifold or any other fluid component to which a conduit is to be attached.

Although this embodiment provides for a threaded connection between the first and second coupling components 12, 14, threaded connections are only one of the many available choices. Alternatives include but are not limited to clamped or bolted connections. The type of connection used will be determined by the nature of the force needed to secure the assembly 10 to the conduit end in a fluid tight manner. Generally speaking, a fitting such as illustrated in FIG. 1 may be used for a flareless end connection, meaning that the conduit cylindrical shape is not flared as a processing step prior to connection to another fluid member (although the conduit may plastically deform during the installation process). The conduit end does not require any particular preparation other than perhaps the usual face and debur process for the end surface C1. In still a further alternative embodiment, the male and female threading may be reversed for the first and second coupling components.

The coupling body 12 may itself be considered a fluid member that is connected to the conduit end C, or may include an end configuration (not shown) that may be further connected to another part. For example, the end configuration for the body 12 may include a male threaded end of a conventional tube fitting body, but any end connection configuration may be used as needed to connect the conduit end C into the fluid system or to another fluid member.

The first coupling member 12 and second coupling member 14 may include wrench flats 20, 22 respectively to assist in joining and tightening the assembly 10 together during pull-up of the fitting. Relative rotation between the coupling members 12, 14 may be used to tighten and loosen (also known in the art as 'make' and 'unmake') the fitting assembly 10 as appropriate.

The fitting body 12 may include a central bore 24 having a diameter that is about the same as the diameter of inside cylindrical wall 26 of the conduit C. For most connections, although not necessarily required in all cases, the bore 24 and conduit C are aligned and assembled in a coaxial manner along the axis X.

The body type coupling member 12 may include a counterbore 28 that with an interior generally cylindrical wall 30 defines a conduit socket or tube socket 32 into which the conduit end C is inserted as part of the assembly process. The interior generally cylindrical wall 30 may have a diameter that closely receives the outer diameter surface C2 of the conduit end C. The interior wall 30 extends axially to a frusto-conical camming surface 36. The interior wall 30 is referred to herein as 'generally' cylindrical in that it may be slightly tapered, and/or it may include a short length "tube capture" portion that adjoins the counterbore and has a taper to it. The exemplary fitting 700 of FIG. 19 includes a fitting body 712 with an interior wall 730 having a tapered portion 734 adjoining the counterbore 728. An exemplary fitting body with tapered interior surfaces is also described in co-owned U.S. Pat. No. 8,876,170 (the "'170 Patent"), the entire disclosure of which is incorporated herein by reference.

The conduit gripping device of the fitting assembly 10 may include one or more conduit gripping members, such as ferrules for example, with two ferrules 38, 40 being included in the illustrated embodiment. Some fitting designs only use one ferrule, others may use more than two ferrules, alternatively may use additional parts such as seals, gaskets and so on, and alternatively may use gripping rings or devices that might be generally known by terms other than 'ferrule' but provide grip and seal as a conduit gripping member. As used herein, the terms ferrule and conduit gripping member are intended to include within their definition and meaning any component or combination of components that may grip the conduit end after pull-up, seal the fitting either along the conduit or elsewhere, or both. For example, in a single ferrule fitting the single ferrule both seals and grips the conduit. In the exemplary two ferrule assembly of FIG. 1, the forward or front ferrule 38 typically may be used to form a fluid tight seal against the camming surface 36, but may also grip the conduit in some designs and may also in some designs seal against the conduit outer surface C2. The rearward or back ferrule 40 typically may be used to grip the conduit C, but may also seal against the conduit or seal against the back end of the front ferrule 38. Fitting designs that use ferrules or other conduit gripping and sealing devices are well known and vary widely in their design and ratings, such as pressure and leakage ratings. The ferrules may be provided to grip the conduit C against an outer surface C2 thereof. For higher pressure applications it may be desirable for the ferrule or ferrules to indent, cut or bite into the conduit outer surface C so as to provide a strong gripping pressure and resistance to the conduit C backing away under pressure and potentially compromising fluid tight seals within the fitting 10. However, in lower pressure applications the conduit gripping members 38, 40 may be designed to adequately grip the conduit without actually indenting or cutting the conduit surface C2. In addition to providing an appropriate gripping force on the conduit C, the gripping members 38, 40 may also provide a primary or secondary fluid tight seal against the conduit external surface C2 to protect against loss of fluid from the assembly 10. Therefore, as understood herein, a conduit gripping member or ferrule is any part or combination of parts that, upon complete pull-up of the fitting, grips the conduit against pressure, vibration and other environmental effects, and also provide a fluid tight seal. The conduit gripping members may include heat treated hardened ferrules, with the heat treating being, for example, a case hardening of stainless steel or some other metal alloy by a lower temperature interstitial (e.g., carbon, nitrogen, or both) diffusion into the metal ferrule.

The exemplary fitting assembly 10 is installed on the conduit end C by inserting the conduit end into the conduit socket 32 of the fitting body 12, and through the conduit gripping members 38, 40 to bottom the conduit end C against the conduit socket (e.g., against the counterbore 28) within the fitting body 12. In fitting bodies that include a conduit socket having a tapered "tube capture" portion adjoining the counterbore, as described above and in the above incorporated '170 Patent, and shown in the embodiment of FIG. 19, the conduit end may alternatively be considered sufficiently bottomed when brought into engagement with this tapered portion, while still spaced apart from the counterbore 28. The threaded fitting nut 14 is tightened or pulled-up with the threaded end portion 18 of the fitting body 12 (e.g., a predetermined number of turns from a finger tight condition, or to a predetermined torque) to drive the conduit gripping members 38, 40, resulting in axially and radially inward movement against the axially fixed conduit outer surface C2 to affect a grip and seal against the conduit end C. As the conduit gripping members 38, 40 grip the conduit outer surface C2, a corresponding axial and radial movement is imparted to the conduit end C. When such a fitting is pulled up on a conduit end that is not bottomed against the conduit socket (i.e., an un-bottomed condition), the portion of the tightening forces on the conduit gripping device that affects axial movement of the conduit end within the conduit socket is not easily detectable in a conventional fitting assembly.

During pull-up of a properly installed fitting, the portion of the tightening forces on the conduit gripping device that affects axial movement of the conduit end within the conduit socket applies an axially compressive load between the bottomed conduit end C1 and the counterbore 28 and/or tapered portion of the conduit socket 32. Simultaneously, in reaction to this compressive load, an axial tensile strain is produced in the body wall surrounding the conduit socket. Through finite element analysis, applicants have found that these tensile forces result in at least a first outer portion of the fitting body neck axially proximate to the counterbore and the threaded end portion being in 'axial tensile strain.' Conversely, if the conduit end is not bottomed against the conduit socket 32, there is not an axial compression into the counterbore, and therefore there is no tensile strain between the counterbore and the body threads, and therefore no tensile strain in at least the first outer portion of the fitting body neck. Through finite element analysis, applicants have found that an exemplary fitting that is pulled up on an un-bottomed conduit end experiences an 'axial compressive strain' in the first outer portion of the fitting body neck. Applicants have therefore determined that a measurement of axial strain in the fitting body neck portion of a conduit fitting may be used to determine either or both of fitting pull-up (e.g., the existence of pull-up or extent of pull-up), based on strain magnitude, and a bottomed or un-bottomed condition of fitting assembly, based on strain direction (e.g., tensile axial strain corresponding to a bottomed fitting assembly and compressive axial strain corresponding to an un-bottomed fitting assembly).

FIGS. 2 and 2A illustrate a finite element analysis (FEA) simulation of an exemplary tube fitting installed on a ¼ inch tube end bottomed against the fitting body conduit socket. As shown, tensile strain in the fitting body is concentrated in a portion Sa of the fitting body neck axially proximate to the counterbore and the threaded end portion of the fitting body, extending to the inner wall of the conduit socket adjacent to the counterbore.

FIGS. 3 and 3A illustrate an FEA simulation of the same exemplary tube fitting installed on an un-bottomed ¼ inch tube end. As shown, an axial compressive strain is evident in a portion Sb of the fitting body neck proximate to the counterbore and the threaded end portion of the fitting body, extending to the inner wall of the conduit socket adjacent to the nose of the front ferrule.

In an exemplary method for installing a fitting on a conduit, a conduit is inserted in an internal conduit socket of a fitting body having a threaded end portion and a neck portion extending rearward from the threaded end portion, with the internal conduit socket extending axially into the neck portion and terminating at a counterbore. A fitting nut is pulled up on the fitting body to grip and seal a conduit gripping device against the conduit. Relative axial displacement of at least first and second reference locations on the neck portion may be measured or detected to determine at least one of (a) whether (and to what extent) the fitting has been pulled up, and (b) whether the conduit is bottomed against the conduit socket.

According to an exemplary aspect of the present application, a condition of axial strain in the fitting body neck portion of an installed fitting may be detected to determine a bottomed or un-bottomed condition of the inserted conduit end within the fitting body of the installed or pulled-up fitting assembly. This condition may be identified, for example, by measuring or otherwise identifying the relative axial movement of at least first and second reference locations R1, R2 on the fitting body neck portion 54 (FIG. 1) when the fitting 10 is pulled up from a finger tight condition to a partially tightened or fully tightened condition. Consistent with the FEA results described above, pull-up of a fitting assembly 10 on a bottomed conduit end C may be expected to result in a measurable increase in the axial distance between the at least first and second reference locations R1, R2 (consistent with tensile strain), while pull-up of a fitting assembly 10 on an un-bottomed conduit end C may be expected to result in no measurable increase in the axial distance between the at least first and second reference locations R1, R2 (consistent with a lack of tensile strain), and in at least some embodiments, a measurable decrease in the axial distance between the at least first and second reference locations R1, R2 (consistent with compressive strain).

According to another exemplary aspect of the present application, a condition of axial strain in the fitting body neck portion of an installed fitting may be detected to determine a pulled-up condition of the fitting assembly. This condition may be identified, for example, by measuring or otherwise identifying the relative axial positions of at least first and second reference locations R1, R2 on the fitting body neck portion 54 (FIG. 1) with respect to known or predetermined positions of the reference locations corresponding to the finger tight condition of the fitting assembly. Consistent with the FEA results described above, pull-up of a fitting assembly 10 on a bottomed conduit end C may be expected to result in a measurable increase in the axial distance between the at least first and second reference locations R1, R2 (consistent with tensile strain), while pull-up of a fitting assembly 10 on an un-bottomed conduit end C may be expected to result in a measurable decrease in the axial distance between the at least first and second reference locations R1, R2 (consistent with compressive strain).

Many different mechanisms may be utilized to measure or otherwise identify the relative axial movement of first and second reference locations on a fitting body neck portion during fitting pull-up, or the relative axial positions of first and second reference locations on a fitting body neck portion after fitting installation. One exemplary detecting mechanism may include a sensing function associated with (e.g., assembled with or applied by a tool or other such component to) the fitting for measuring such axial movement and generating an electrical signal corresponding with the measured axial movement.

A fitting with an associated sensing function can be considered a 'smart fitting,' meaning that a fitting or assembly for a mechanically attached connection includes a sensing function that may provide information or data to an analytical function or process about the health, properties, assembly, condition and status of one or more of the fitting components, the fluid contained by the fitting, or both. In the present disclosure, the exemplary embodiments as illustrated herein include a sensing function that is incorporated into or otherwise associated with a component or part or member of the fitting, or added to a fitting by means of a sensor carrier or substrate that is provided to position a sensing function in the fitting to perform its designed function.

This aspect of the present invention is not limited to any particular fitting design or configuration, and is also directed to the idea of introducing into or including with such fittings a sensing function. Due to the sometimes highly complex and numerous uses of fittings in a fluid system, it may be desirable to be able to sense one or more conditions, or collect data and information, regarding the assembly, performance or health of a fitting or the fluid contained by a fitting or both. The present inventions provide apparatus and methods for introducing sensing functions into an existing fitting design, an installed fitting design, or providing a sensing function as part of a new fitting or fitting installation, repair, retrofit or as part of a maintenance operation. The fluid system designer may develop all different types of control and monitoring systems to utilize the data and information collected or obtained right at the fitting site, including as needed on a real-time basis. The control and monitoring system or circuit may be conveniently disposed outside the fitting, even in a remote location, and use wired or wireless communication links with the sensor unit to receive the data and information provided by the sensor unit. Alternatively the circuit may be integrated with the fitting itself, such as on an exterior surface for example. By 'remote,' it is generally meant that the circuit is away from or spaced apart from the fitting, and may be at a distance from the fitting, but the term is not intended to imply nor require that it must be a great distance or even beyond line of sight, although in some applications such longer distance communication may be desirable, either in a wired or wireless manner. Some sensor units may be interrogated by circuits that are handheld within a close remote location or range such as a foot or less for example (e.g., incorporated into a smart phone, smart watch, a forward display data visioning system, or other portable electronic device). An RFID tag is a common example of such a device.

In accordance with an exemplary aspect of the present application, one or more sensors and sensing functions, whether wetted or non-wetted type sensors, may be associated with the neck portion of the fitting body. Use of installable sensing functions allows a designer to provide a common fitting design that can be made 'smart' simply by introducing the sensing function into an installable component such as a sensor unit or package that may be assembled with or attached to the fitting body. For example, even after a fitting has been installed into a fluid circuit, the fitting can be made smart by attaching one or more sensor units to the fitting, can have one or more sensor units removed, or have different sensor units added or removed. Use of a sensing function in an attachable or installable part also facilitates postponement of final fitting configuration to the field, which allows for more efficient inventory control since an end user would not need to stock both 'smart' and regular fittings. Alternatively or additionally, the sensing function may be incorporated into or integrated with the fitting body.

The sensor units may take a wide variety of forms and functions. Each sensor unit may include a wetted sensor meaning that a portion of the sensor is exposed to the system fluid passing through the fitting, or a non-wetted sensor that is not exposed to the system fluid, or a combination thereof. A sensor unit may be used, for example, to sense, detect, measure, monitor or otherwise collect information or data about a property or characteristic of the mechanically attached connection, and to communicate such data to electronics (e.g., a processor) configured to evaluate, display, and/or report conditions corresponding to the collected data. While exemplary embodiments of the present application relate to the measurement of axial strain corresponding to pull-up and/or conduit bottoming in a pulled-up fitting, sensor units contemplated by the present application may additionally or alternatively detect or measure conditions relating to other properties or characteristics of the fitting, including, for example, general leakage, changes in stress, vibration, temperature, or system pressure to name a few examples. For example, a wetted sensor or package of sensors may additionally or alternatively sense, for example, conditions indicative of one or more of pressure, temperature, galvanic effects, fluid density, refractive index, viscosity, optical absorbance, dielectric properties, flow rate, conductivity, pH, turbidity, thermal conductivity, moisture, gas or liquid specific properties and so on to name a few examples. As another example, a non-wetted sensor or package of sensors may additionally or alternatively sense, for example, conditions indicative of one or more of pressure, temperature, seal integrity, leakage, leak rate, stress and stress profiles, vibration, sound waves, and so on.

The sensor units may operate in many different ways, including but not limited to electromagnetic, acoustic-magnetic, magnetic resonance, inductive coupling including antenna, infrared, eddy current, ultrasonic and piezoelectric signal transmission. The sensor unit or sensor package may communicate (e.g., by connection with a circuit or antenna) in a wired or wireless manner with the latter including but not limited to BLUETOOTH™, Wi-Fi, 2G, 3G, RFID, acoustic, infrared, and optical signal communication.

There is a wide variety of sensors commercially available today that may be used for various sensing functions. Undoubtedly, many more sensors will be developed and commercialized during the coming years, especially sensors that will have greater functionality, significantly small footprints, alternative installation and integration capabilities and communication functionality. The present inventions contemplate and facilitate the use of such sensors known today or later developed, in fittings as described herein.

Examples of commercially available sensors include but are not limited to the following:

Micro-miniature absolute pressure sensor model 32394 available from Endevco Corporation. This is a silicon MEMS device that can be substrate or surface mounted with a conductive epoxy.

Another pressure sensor or transducer is the model 105CXX series available from PCB Piezotronics, Inc. These sensors are in very small packages or may be repackaged as needed for a particular application, and operate with piezoelectric technology.

Liquid flow meters such as models SLG 1430 and ASL 1430 available from Sensirion AG.

Miniaturized seismic transducers, motion transducers and angular rate sensors available from Tronics Microsystems SA.

Tilt and vibration sensors, angle sensors, MEMS inclinometers, MEMS vibration sensors and MEMS accelerometers models SQ-SENS-XXXX, SQ-SIXX, SQ-PTS, SQ-SVS and SQ-XLD respectively, available from Signal Quest, Inc.

Piezoelectric accelerometers model TR1BXN having temperature sensing capability, available from Oceana-Sensor, Virginia Beach, Va.

Thermal sensors models LM and STXXX (numerous variations) available from ST Microelectronics.

Thermistors, IR temperature sensors, gas tube arresters and varistors available from Semitec USA Corporation.

Linear displacement sensors models M, MG, S, SG and NC type DVRTs available from MicroStrain Inc.

Proximity switches available from COMUS International.

The above are but a few examples of miniaturized sensors available that may be used with the present inventions. The present inventions facilitate and enable such sensor technology to be incorporated into fittings and mechanically attached connections. Reference may be made to the manufacturer's web pages for additional product information. While the basic product literature may illustrate specific packaging concepts, the sensors may be either repackaged or alternatively integrated with a fitting component or member in accordance with one or more of the various inventions herein.

Exemplary embodiments of 'smart' fittings equipped with a variety of sensors to perform a variety of functions are disclosed in co-owned U.S. Pat. No. 8,439,404 (the "'404 Patent") and co-pending U.S. Patent Application Pub. No. 2013/0270814 (the "'814 Application"), both titled CON- DUIT CONNECTION WITH SENSING FUNCTION, the entire disclosures of which are fully incorporated herein by reference.

Figure 4:
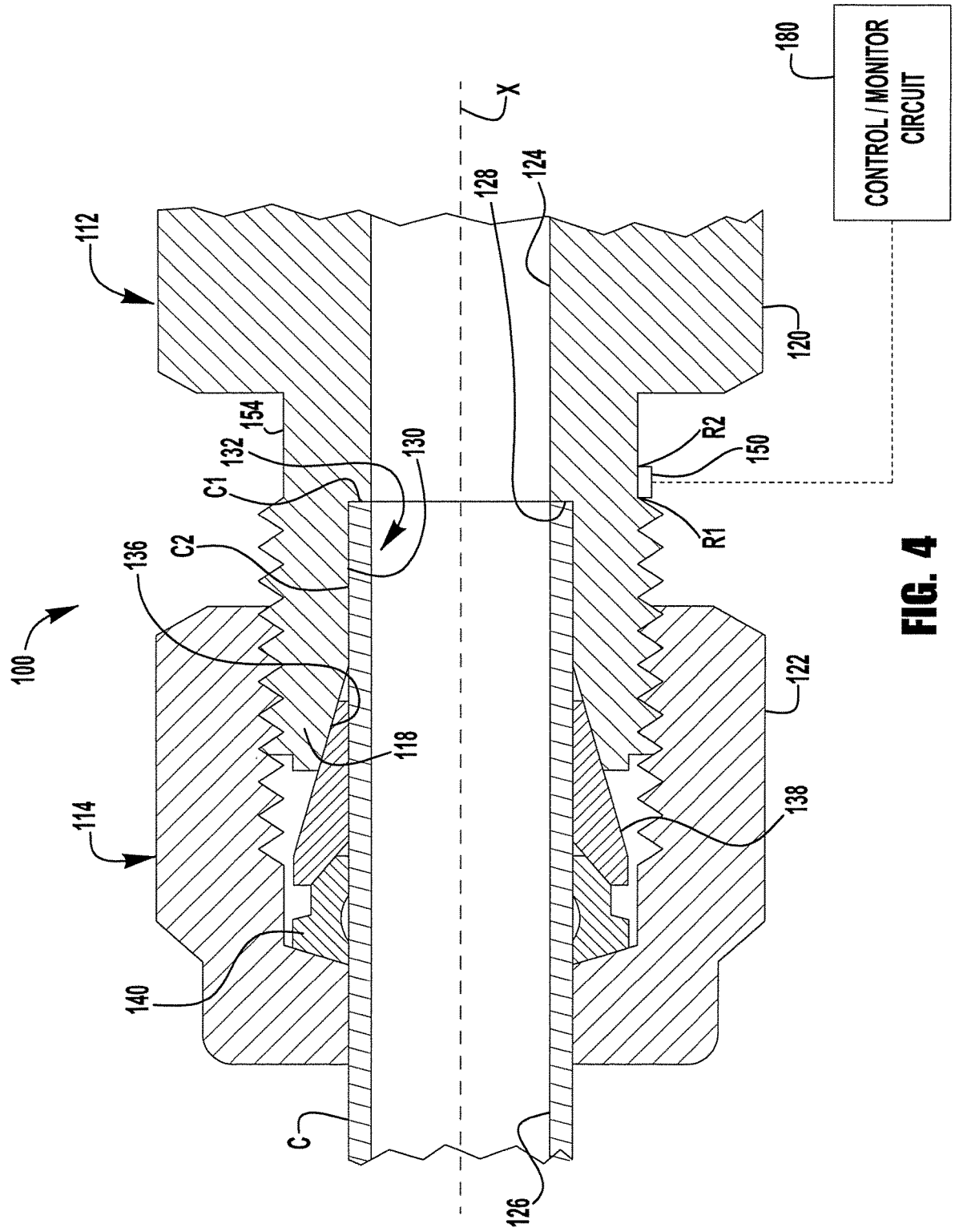
FIG. 4 is a cross-sectional view of an exemplary embodiment of a fitting assembly incorporating one or more inventions disclosed herein, shown in a finger tight condition prior to pull-up.

FIG. 4 illustrates an exemplary embodiment of the inventions, including a fitting assembly 100 that may (but need not) be consistent with the fitting assembly of FIG. 1 (and using like reference numerals accordingly), including a sensor unit 150 associated with the fitting. As shown, the sensor unit 150 may be attached to, secured over, or otherwise disposed on at least first and second reference locations R1, R2 on an outer surface of the fitting body neck portion 154, for measurement of relative axial movement of at least the first and second reference locations R1, R2 during pull-up of the fitting, with the relative axial movement corresponding to axial strain of the fitting body neck portion. As described herein and shown in FIG. 4, the reference locations R1, R2 may be indistinguishable (e.g., unmarked) locations on the continuous fitting body surface that coincide with the location sensing features of the attached sensor unit 150. In other embodiments, as described in greater detail below, the reference locations R1, R2 may correspond to visible, tactile, and/or materially discernible indicia (e.g., markings, notches, affixed elements having different electrical or other properties, etc.) that facilitate sensor detection of relative axial movement of these features.

While the sensor unit 150 may be attached to a variety of locations on the outer surface of the fitting body neck portion, in an exemplary embodiment, the sensor unit is positioned proximate to the threaded end 118 of the fitting body 112, and distal to the outer shoulder 115 of the fitting body, consistent with the location of concentrated axial strain in the finite element analyses discussed above. In one such example, the sensor unit is positioned within ¼ to ⅓ of the total neck length from the rear or base thread.

Further, while the sensor unit may be oriented to measure only axial displacement of the fitting material, the sensor unit may additionally or alternatively be oriented to measure a lateral component of material displacement of the fitting, for example, by being positioned at an angle from an axial or longitudinal orientation. In one example, a sensor unit includes a compound strain sensor configured to measure material displacement or strain in a plurality of directions, including, for example, purely axial ("tensile") strain and purely lateral or circumferential ("hoop") strain, and orientations at angles between axial and lateral orientations. These other strain measurements, in addition to or instead of axial strain measurements, may allow a control and monitoring device in communication with the sensor unit (as described in greater detail below) to filter out measured strain properties corresponding with normal system conditions, or to monitor other properties of the fluid system (e.g., system pressure, vibration, leakage, etc.). In other embodiments, a sensor unit or sensor package may include multiple sensors of different types and/or orientations. In one exemplary embodiment, a first strain sensor oriented to measure strain in an axial direction is provided in combination with a second strain sensor oriented to measure strain in a circumferential or lateral direction to amplify (e.g., to improve detection) strain measurements (for example, where a measurable compressive circumferential or hoop strain accompanies a measurable tensile strain). In another exemplary embodiment, a first strain sensor oriented to measure strain in an axial direction is provided in combination with a second strain sensor oriented to measure strain in a circumferential or lateral direction to provide for adjustments to measurements for variations due to temperature fluctuations or thermal expansion.

Still further, while the sensor unit may be configured to measure displacement of two discrete reference locations R1, R2 on the fitting, the sensor unit may be configured to measure relative displacement of numerous reference locations over a region of the fitting to which the sensor unit is attached, for example, to measure a strain profile across the fitting region (e.g., across a distal portion of the fitting body neck). In one example, a sensor unit is secured (e.g., cemented, fastened, or otherwise affixed) along a length of the fitting component to measure a strain profile across the length to which the sensor unit is secured.

The sensor unit 150 may take a variety of forms. In an exemplary embodiment, the sensor unit includes one or more strain sensors oriented to measure axial strain in the portion of the fitting body neck to which the sensor unit is attached. As one example, a resistance strain sensor includes a metal wire grid across which an electrical resistance changes in response to compressive or tensile strain on the grid. As another example, a capacitive strain sensor include parallel plates across which a capacitance changes in response to strain movement of a diaphragm disposed between the plates. As yet another example, an inductive strain sensor includes two coils between which an induced electrical current changes with strain movement of a diaphragm between the coils. As still another example, a piezoresistive strain sensor includes a semiconductor or crystal structure for which an electrical resistance changes with compressive or tensile strain. As another example, a piezoelectric strain sensor includes a semiconductor or crystal structure for which an electrical voltage changes with compressive or tensile strain. As another example, a reluctive strain sensor includes a charged ferromagnetic core for which a magnetic flux changes with strain movement of an adjacent ferromagnetic plate. As still another example, a potentiometric strain sensor includes a potentiometer for which an electrical resistance changes with strain movement of a contacting conductor. As yet another example, a resonant strain sensor includes a vibrating element for which a sonic resonant frequency changes with compressive or tensile strain of the element. As another example, an optical strain sensor includes an illuminated element for which a reflective wavelength changes with compressive or tensile strain of the element. As another example, an electromagnetic strain sensor may include, for example, a linear variable differential transformer (LVDT), a Hall effect sensor, or an eddy current conductor.

The sensor unit 150 may be attached to the outer surface of the fitting body neck portion using a variety of arrangements, including, for example, adhesives, laminates, or fired glasses or ceramics, including direct write or additive manufacturing process providing 3D printing directly on the surface for application of the insulator and sensing element.

Figures 4A, 4B:
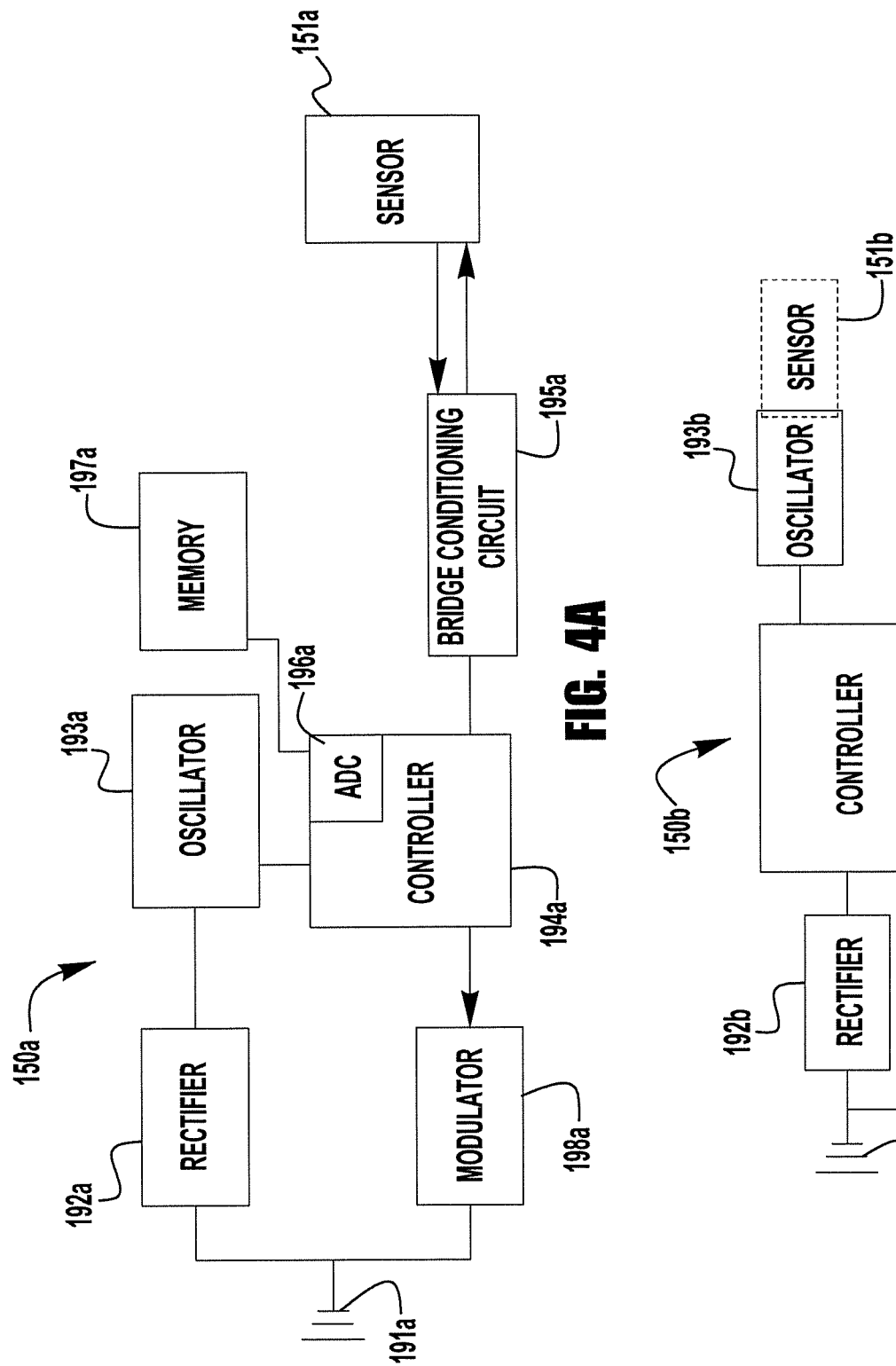
FIG. 4A is a schematic view of a sensor unit incorporating one or more inventions disclosed herein.
FIG. 4B is a schematic view of another sensor unit incorporating one or more inventions disclosed herein.

In one exemplary embodiment, as schematically shown in FIG. 4A, the sensor unit includes an RFID tag 150a connected with an axially extending resistance strain gauge 151a, as described above, configured to have an electrical resistance that varies in response to tensile or compressive strain on the strain gauge. An antenna 191a receives electromagnetic radio frequency (RF) signals from a remote RFID reader (not shown). A rectifier 192a connected with the antenna 191a converts the RF signals to DC voltage to power an oscillator 193a, memory 197a, modulator 198a, bridge conditioning circuit 195a, and a controller 194a. The controller 194a is connected to the strain gauge 151a through the bridge conditioning circuit 195a to supply an electrical signal to the strain gauge and receive a variable response signal based on the strain influenced variable resistance of the strain gauge 151a. The bridge conditioning circuit 195a is configured to condition the excitation voltage for delivery to the strain gauge and to amplify and shift the output voltage received from the strain gauge. The controller 194a further includes an analog-to-digital converter (ADC) 196a to convert conditioned output voltage to a digital signal indicating the voltage amplitude. The generated output data signal may be written to a memory 197a for subsequent access via RFID transmission. The controller 194a is connected with a modulator 198a for modulation of the stored output data, along with pre-stored RFID chip identifying data, to generate a modulated backscattered signal, at a frequency controlled by the oscillator, for transmission to the RFID reader.

In another exemplary embodiment, as shown in the schematic view of FIG. 4B, the sensor unit includes an RFID tag 150b connected with an axially extending strain gauge 151b (a capacitance varying strain gauge). An antenna 191b receives electromagnetic radio frequency (RF) signals from a remote RFID reader (not shown). A rectifier 192b connected with the antenna 191b converts the RF signals to DC voltage to power an oscillator 193b and a controller 194b. The strain gauge 151b is connected with the oscillator 193b (e.g., a resonator based oscillator) for tuning the oscillator frequency in response to tensile or compressive strain experienced by the strain gauge. A modulator 198b modulates an identifying data signal generated by the controller 194b for transmission by the antenna 191b at the tuned frequency. The resulting frequency of the modulated output signal provides an indication to the RFID reader of the measured strain condition, by RFID reader measurement of the modulation frequency of the RFID tag. By identifying the strain condition to the RFID reader using the modulated output signal frequency, the strain condition may be measured and identified without the signal conditioning and analog-to-digital conversion steps described above, thereby reducing power usage of the RFID tag sensor unit for these functions. This power reduction may allow for an increased "read-out range" of the RFID tag, reduced size requirements, or elimination of supplemental power sources (e.g., batteries). Examples of sensing arrangements utilizing a sensor to vary oscillator frequencies on a passive RFID tag transponder are described in PCT International Publication No. WO 2015/101695, the entire disclosure of which is incorporated herein by reference.

According to another inventive aspect of the present application, an axial strain measuring sensor may be disposed in a recess in the outer surface of the fitting body neck portion, for example, to protect the sensor from damage caused by impact to the outermost surfaces of the fitting body. Through finite element analysis, applicants have found that when a circumferential notch is provided in the outer surface of the fitting body neck, proximate the threaded end portion, an axial tensile strain concentration is located at the inner surface of the notch when the fitting is pulled up on a bottomed conduit end, and an axial compressive strain concentration is located at the inner surface of the notch when the fitting is pulled up on an un-bottomed conduit end. Notches or other such recesses may be formed in the neck portion of a fitting body using a variety of techniques, including, for example, laser engraving, wire EDM, chemical etching, or other suitable means.

Figure 6A:
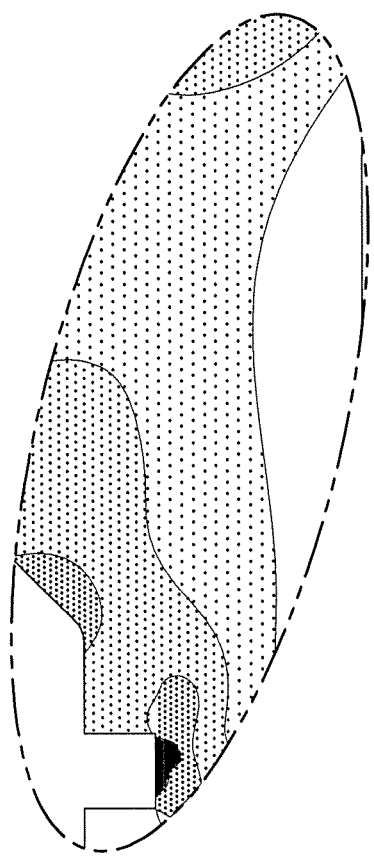
FIG. 6A illustrates an enlarged view of the body neck portion of the un-bottomed fitting assembly of FIG. 6.
Figure 6:
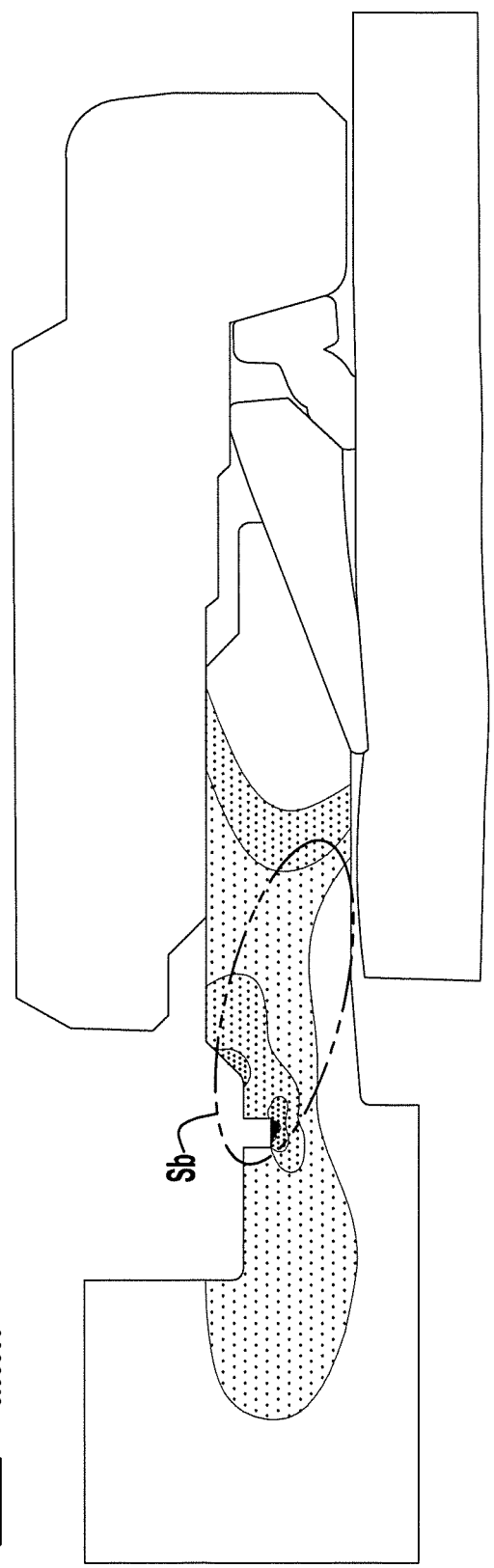
FIG. 6 illustrates an FEA simulation of the fitting of FIG. 5 installed on an un-bottomed conduit end.

FIGS. 5, 5A, 6, and 6A illustrate finite element analysis (FEA) simulations of an exemplary tube fitting having a fitting body with a 0.01 inch deep, 0.01 inch wide circumferential notch disposed in the neck portion proximate the threaded end, installed on a ¼ inch, 0.065 inch wall tube end. In FIGS. 5 and 5A, the tube end is bottomed against the counterbore of the fitting body conduit socket. As shown, tensile strain in the fitting body is concentrated in a portion Sa of the fitting body neck around the circumferential notch, extending to the inner wall of the conduit socket adjacent to the counterbore. In FIGS. 6 and 6A, the tube end is un-bottomed within the fitting body conduit socket. As shown, an axial compressive strain is evident in an outer portion Sb of the fitting body neck around the circumferential notch, extending to the inner wall of the conduit socket adjacent to the nose of the front ferrule.

FIGS. 7, 7A, 8, and 8A illustrate finite element analysis (FEA) simulations of an exemplary tube fitting having a fitting body with a 0.01 inch deep, 0.02 inch wide circumferential notch disposed in the neck portion proximate the threaded end, installed on a ¼ inch, 0.065 inch wall tube end. In FIGS. 7 and 7A, the tube end is bottomed against the counterbore of the fitting body conduit socket. As shown, tensile strain in the fitting body is concentrated in a portion Sa of the fitting body neck around the circumferential notch, extending to the inner wall of the conduit socket adjacent to the counterbore. In FIGS. 8 and 8A, the tube end is un-bottomed within the fitting body conduit socket. As shown, an axial compressive strain is evident in an outer portion Sb of the fitting body neck around the circumferential notch, extending to the inner wall of the conduit socket adjacent to the nose of the front ferrule. As shown, the axial tensile and compressive strains on the fitting assembly of FIGS. 7-8A are less pronounced than the corresponding strains on the fitting assembly of FIGS. 5-6A, due to the strains being concentrated over a greater notch width or length of neck on the notch floor.

FIGS. 9, 9A, 10, and 10A illustrate finite element analysis (FEA) simulations of an exemplary tube fitting having a fitting body with a 0.01 inch deep, 0.01 inch wide circumferential notch disposed in the neck portion proximate the threaded end, installed on a ¼ inch, 0.035 inch wall tube end. In FIGS. 9 and 9A, the tube end is bottomed against the counterbore of the fitting body conduit socket. As shown, tensile strain in the fitting body is concentrated in a portion Sa of the fitting body neck around the circumferential notch, extending to the inner wall of the conduit socket adjacent to the counterbore. In FIGS. 10 and 10A, the tube end is un-bottomed within the fitting body conduit socket. As shown, an axial compressive strain is evident in an outer portion Sb of the fitting body neck around the circumferential notch, extending to the inner wall of the conduit socket adjacent to the nose of the front ferrule. As shown, the axial tensile and compressive strains on the fitting assembly of FIGS. 9-10A are less pronounced than the corresponding strains on the fitting assembly of FIGS. 5-6A. This can be attributed to the thinner wall tube applying less of a compressive load on the conduit socket, when the tube end is bottomed during pull-up, thus inducing a lesser tensile load on the body neck, and in the case of the un-bottomed tube end, the thinner wall tube not resisting with as much of a radial reaction the forward wedging action of the front ferrule during pull-up, thus imparting less of a flaring or compressive bending of the body neck.

Figure 12A:
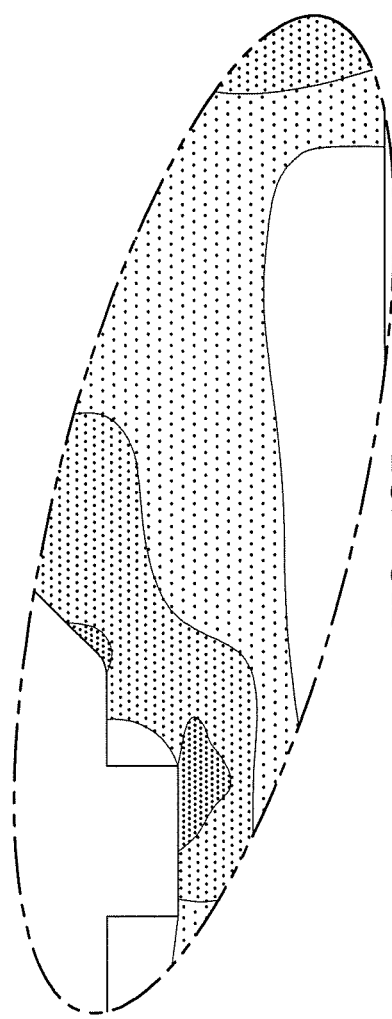
FIG. 12A illustrates an enlarged view of the body neck portion of the un-bottomed fitting assembly of FIG. 12.
Figure 12:
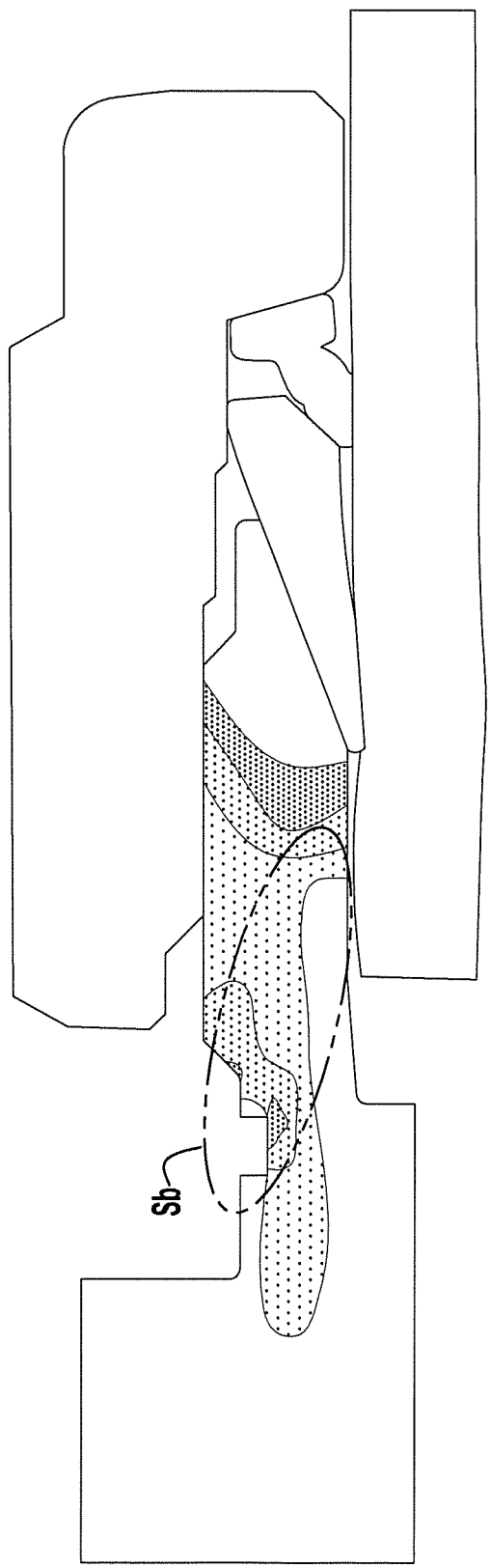
FIG. 12 illustrates an FEA simulation of the fitting of FIG. 11 installed on an un-bottomed conduit end.

FIGS. 11, 11A, 12, and 12A illustrate finite element analysis (FEA) simulations of an exemplary tube fitting having a fitting body with a 0.01 inch deep, 0.02 inch wide circumferential notch disposed in the neck portion proximate the threaded end, installed on a ¼ inch, 0.035 inch wall tube end. In FIGS. 11 and 11A, the tube end is bottomed against the counterbore of the fitting body conduit socket. As shown, tensile strain in the fitting body is concentrated in a portion Sa of the fitting body neck around the circumferential notch, extending to the inner wall of the conduit socket adjacent to the counterbore. In FIGS. 12 and 12A, the tube end is un-bottomed within the fitting body conduit socket. As shown, an axial compressive strain is evident in an outer portion Sb of the fitting body neck around the circumferential notch, extending to the inner wall of the conduit socket adjacent to the nose of the front ferrule. As shown, the axial tensile and compressive strains on the fitting assembly of FIGS. 11-12A are less pronounced than the corresponding strains on the fitting assembly of FIGS. 5-6A, due to the combined effects of the wider notch and the thinner wall tube, as described above.

Figure 13:
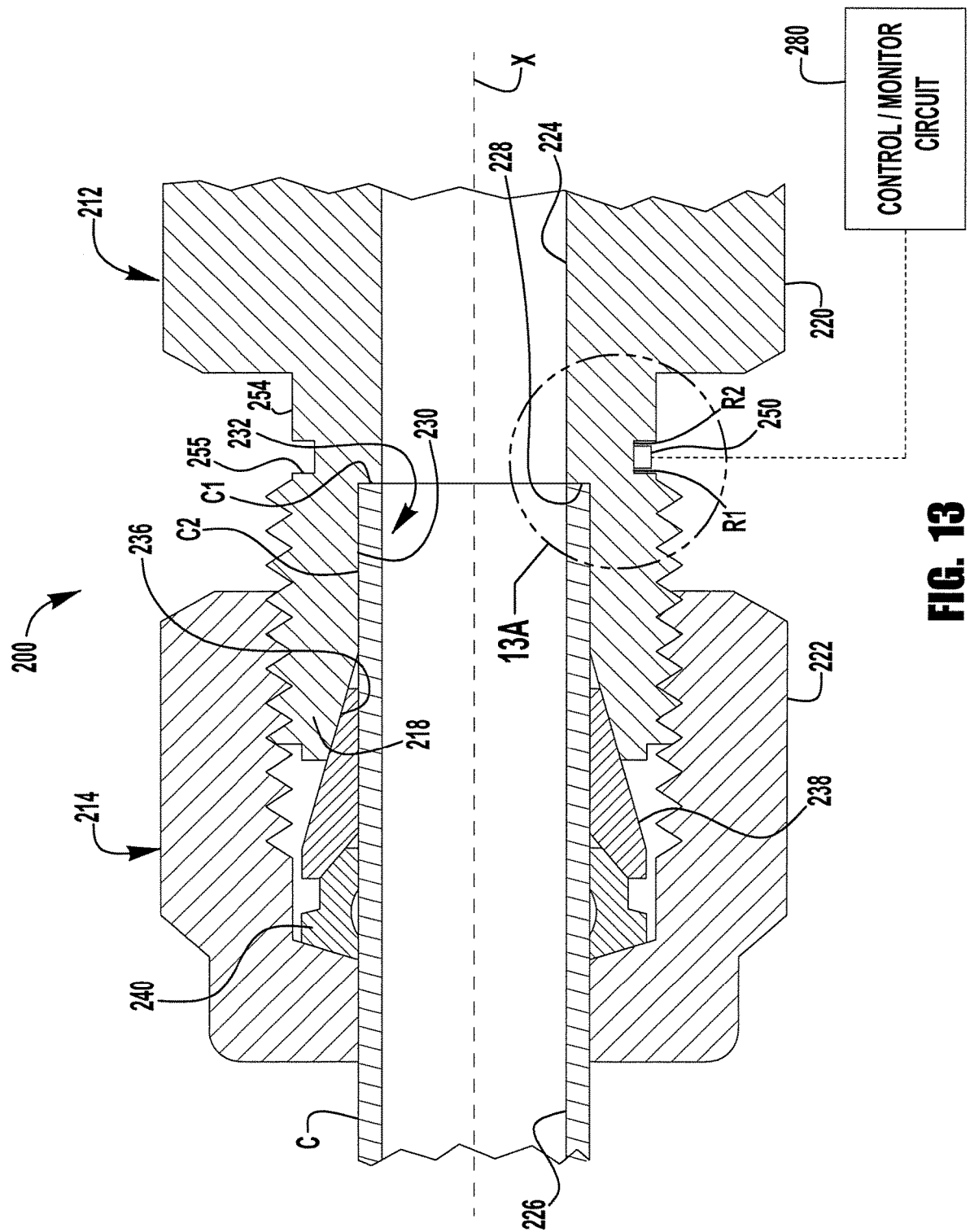
FIG. 13 is a cross-sectional view of an exemplary embodiment of a fitting assembly incorporating one or more inventions disclosed herein, shown in a finger tight condition prior to pull-up.
Figure 13A:
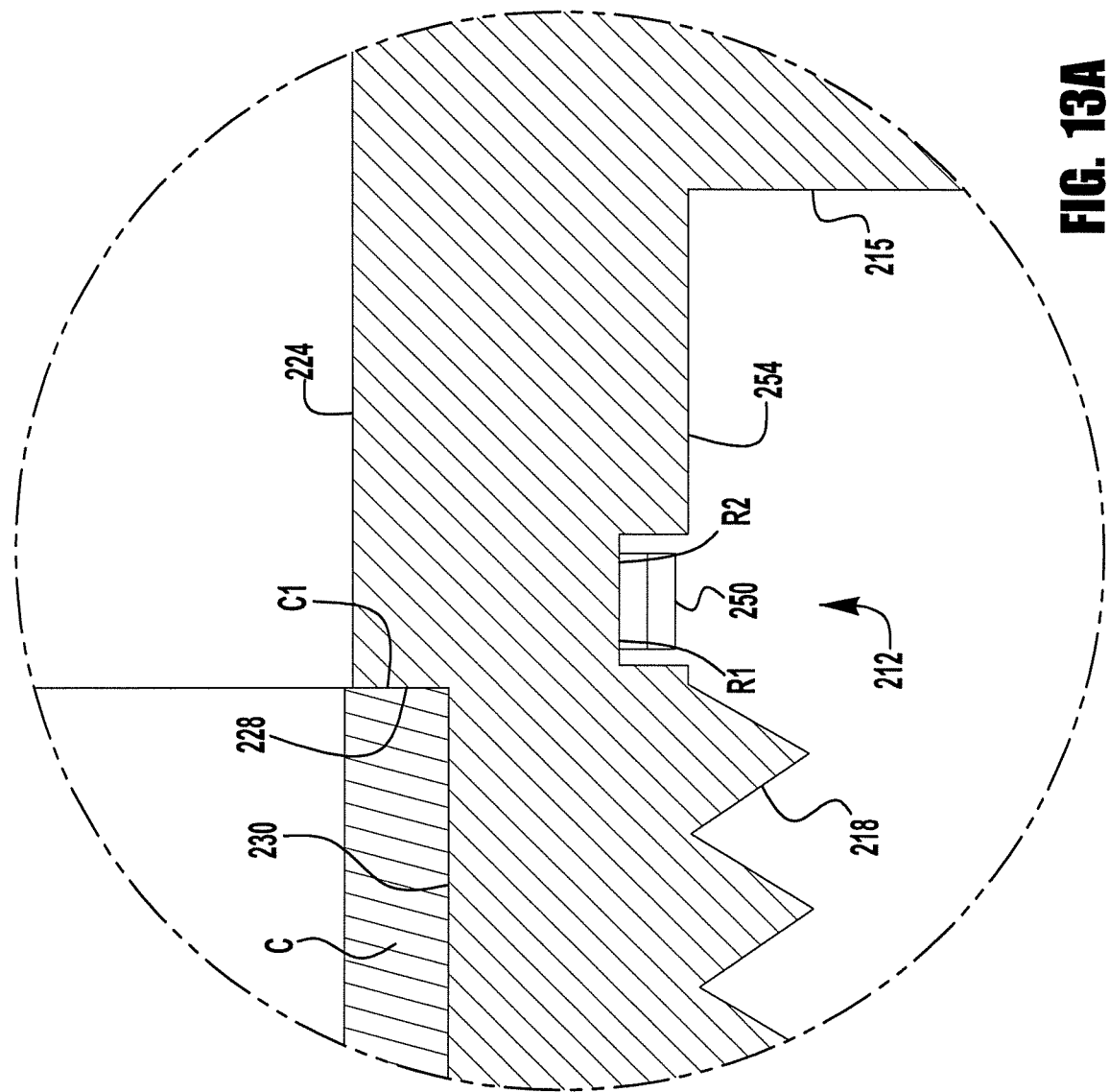
FIG. 13A is an enlarged partial cross-sectional view of a body neck portion of the fitting assembly of FIG. 13.

FIGS. 13 and 13A illustrate an exemplary embodiment of the inventions, including a fitting assembly 200 that may (but need not) be consistent with the fitting assembly of FIG. 1 (and using like reference numerals accordingly), including a sensor unit 250 associated with the fitting. As shown, the sensor unit 250 may be embedded or otherwise attached within a recessed portion 255 in the fitting body neck portion 254, disposed on first and second reference locations R1, R2 within the recessed portion 255 of the fitting body neck portion 254, for measurement of relative axial movement of the first and second reference locations R1, R2 during pull-up of the fitting, with the relative axial movement corresponding to axial strain of the fitting body neck portion. The recessed portion may include a bore, notch, groove, flatted portion, or other such recess, and may be disposed at a discrete circumferential location or extending around an entire circumference of the neck portion. While the recessed portion 255 may be disposed at a variety of axial locations on the outer surface of the fitting body neck portion, in an exemplary embodiment, the recess (with the received sensor unit) is positioned proximate to the threaded end 218 of the fitting body 212, and distal to the outer shoulder 215 of the fitting body, consistent with the location of concentrated axial strain in the finite element analyses discussed above. Also, while the recessed portion 255 may be provided with a depth sufficient to fully receive the sensor unit 250 (e.g., to at least partially protect the sensor unit from external impacts), as shown, in other embodiment, at least a portion of the sensor unit extends outward of the recessed portion.

The sensor unit 250 may take a variety of forms. In an exemplary embodiment, the sensor unit includes a strain sensor, such as, for example, one or more of the strain sensors described in greater detail above. The sensor unit 250 may be attached to the inner surface of the recessed portion 255 using a variety of arrangements, including, for example, adhesives, laminates, or fired glasses or ceramics, including direct write or additive manufacturing process providing 3D printing directly on the surface for application of the insulator and sensing element.

According to another inventive aspect of the present application, applicants have found that the relative axial displacement during fitting pull-up of the opposed walls and outer edges of a circumferential notch in the fitting body neck portion is magnified as compared to the relative axial displacement during pull-up of reference locations on a longitudinal surface of a fitting body neck portion (e.g., on the outer surface or on an inner surface of a recessed portion). This magnification of the axial displacement may facilitate detection of axial strain corresponding to fitting pull-up, in either conduit bottomed or conduit un-bottomed conditions.

FIG. 14 is a chart documenting FEA predicted axial displacement during pull-up of the opposed 0.01 inch and 0.02 inch notch edges of the fittings illustrated in FIGS. 5-6A, 7-8A, and 9-10A. As shown, pull-up of the 0.01 inch notched fitting produced a tensile strain of 4500 microstrain when installed on a bottomed 0.065" wall tube end and a compressive strain of 2200 microstrain when installed on an un-bottomed 0.065" wall tube end. Pull-up of the 0.01 inch notched fitting produced a tensile strain of 3100 microstrain when installed on a bottomed 0.035" wall tube end and a compressive strain of 1700 microstrain when installed on an un-bottomed 0.035" wall tube end. Pull-up of the 0.02 inch notched fitting produced a tensile strain of 2600 microstrain when installed on a bottomed 0.065" wall tube end and a compressive strain of 1250 microstrain when installed on an un-bottomed 0.065" wall tube end. Pull-up of the 0.02 inch notched fitting produced a tensile strain of 1850 microstrain when installed on a bottomed 0.035" wall tube end and a compressive strain of 900 microstrain when installed on an un-bottomed 0.035" wall tube end.

Accordingly, in another embodiment of the present application, an axial strain measuring sensor may be positioned to measure relative axial displacement of first and second opposed walls of a recessed portion in the fitting body neck portion, for example, to obtain magnified or amplified data relating to axial strain in the fitting body neck portion.

Figure 15:
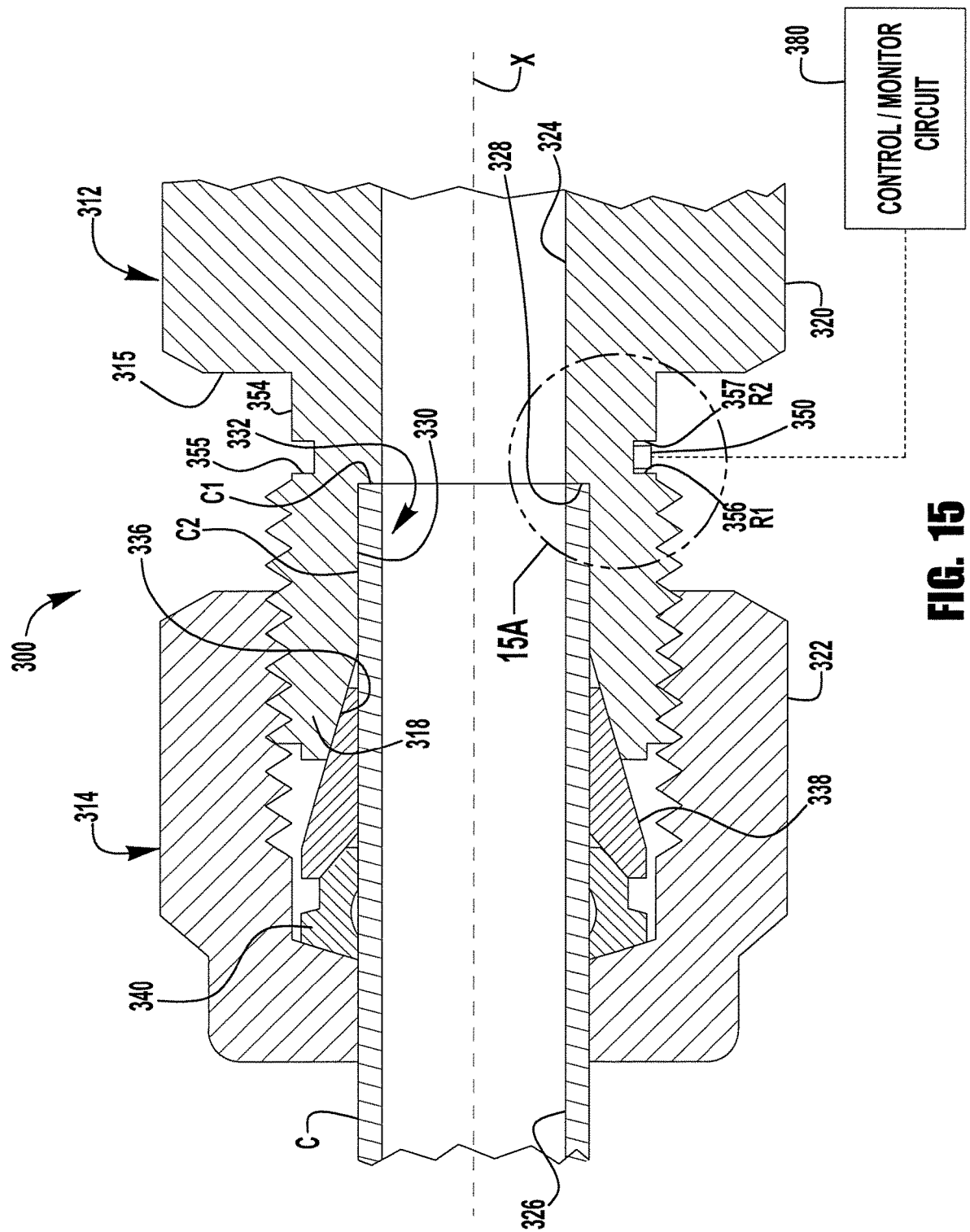
FIG. 15 is a cross-sectional view of an exemplary embodiment of a fitting assembly incorporating one or more inventions disclosed herein, shown in a finger tight condition prior to pull-up.

In one such embodiment, a sensor unit may be embedded or otherwise attached within a recessed portion of the fitting body neck portion, to measure relative axial displacement of the opposed recess walls, which function as sensor detectable indicia for first and second reference locations on the fitting body neck. FIGS. 15 and 15A illustrate an exemplary embodiment of the inventions, including a fitting assembly 300 that may (but need not) be consistent with the fitting assembly of FIG. 1 (and using like reference numerals accordingly), including a sensor unit 350 associated with the fitting. As shown, the sensor unit 350 may be embedded or otherwise attached within a recessed portion 355 in the fitting body neck portion 354, for engagement or other such interaction with first and second reference locations R1, R2 defined by the first and second opposed walls 356, 357 of the recessed portion, for measurement of relative axial movement of the first and second reference locations R1, R2 during pull-up of the fitting, with the relative axial movement corresponding to axial strain of the fitting body neck portion. The recessed portion may include a bore, notch, groove, or other such recess, and may be disposed at a discrete circumferential location or extending around an entire circumference of the neck portion. While the recessed portion 355 may be disposed at a variety of axial locations on the outer surface of the fitting body neck portion, in an exemplary embodiment, the recess (with the received sensor unit) is positioned proximate to the threaded end 318 of the fitting body 312, and distal to the outer shoulder 315 of the fitting body, consistent with the location of concentrated axial strain in the finite element analyses discussed above.

The sensor unit 350 may take a variety of forms. In an exemplary embodiment, the sensor unit 350 includes a strain sensor (e.g., one or more of the exemplary strain sensors described in greater detail above). In one such example, the strain sensor includes a first portion connected to the first recess wall 356 and a second portion connected to the second recess wall 357, such that the strain sensor measures relative axial displacement of the first and second recess walls.

In another embodiment, one of the first and second portions of the sensor may be affixed to the corresponding one of the first and second recess walls 356, 357, and the other of the first and second portions of the sensor may be in loose or non-affixed contact with the other of the first and second recess walls 356, 357. When a tensile strain in the fitting neck causes the recess walls 356, 357 to expand away from each other, the loosely contacted portion of the sensor may separate from the corresponding recess wall, causing the sensor to generate a signal indicative of tensile strain. For example, the loosely contacted portion of the sensor may include an electromechanical switch or one or more of the strain sensors described above.

The sensor unit 350 may be attached to the inner surface of the recessed portion 355 using a variety of arrangements, including, for example, adhesives, laminates, or fired glasses or ceramics, including direct write or additive manufacturing process providing 3D printing directly within the recess, or by embedding in resin potting, powder metal sintering, or brazing material within the recess portion.

Figure 16:
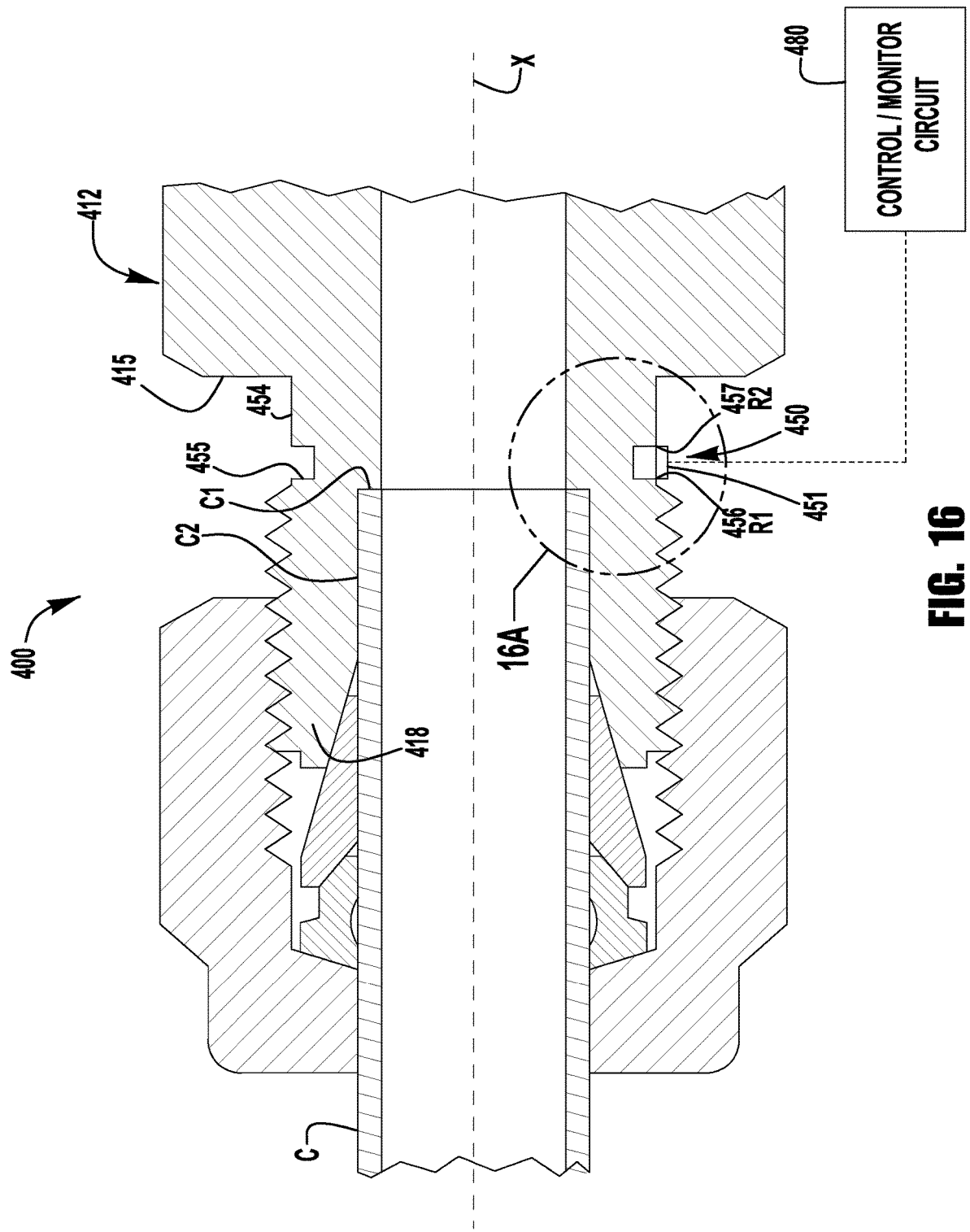
FIG. 16 is a cross-sectional view of an exemplary embodiment of a fitting assembly incorporating one or more inventions disclosed herein, shown in a finger tight condition prior to pull-up.

In another exemplary embodiment, a sensor unit may be attached to an outer surface of a fitting body neck portion to span across a recessed portion in the fitting body neck portion, to measure relative axial displacement of the outer edges of the opposed recess walls, which function as sensor detectable indicia for first and second reference locations on the fitting body neck. FIGS. 16 and 16A illustrate an exemplary embodiment of the inventions, including a fitting assembly 400 that may (but need not) be consistent with the fitting assembly of FIG. 1 (and using like reference numerals accordingly), including a sensor unit 450 associated with the fitting. As shown, the sensor unit 450 may be adhered or otherwise attached to the fitting body neck portion 454, to span across a recessed portion 455 in the fitting body neck portion 454, for connection or other such interaction with first and second reference locations R1, R2 defined by the first and second edge portions 456', 457' of the opposed walls 456, 457 of the recessed portion, for measurement of relative axial movement of the first and second reference locations R1, R2 during pull-up of the fitting, with the relative axial movement corresponding to axial strain of the fitting body neck portion. The recessed portion may include a bore, notch, groove, or other such recess, and may be disposed at a discrete circumferential location or extending around an entire circumference of the neck portion. While the recessed portion 455 may be disposed at a variety of axial locations on the outer surface of the fitting body neck portion, in an exemplary embodiment, the recess (with the received sensor unit) is positioned proximate to the threaded end 418 of the fitting body 412, and distal to the outer shoulder 415 of the fitting body, consistent with the location of concentrated axial strain in the finite element analyses discussed above.

The sensor unit 450 may take a variety of forms. In an exemplary embodiment, a strain sensor unit 450 includes a strain sensor 451 (e.g., one or more of the exemplary strain sensors or strain gauges described in greater detail above). In one such example, the sensor unit 450 includes a strain sensor 451 having a first portion connected to the first recess wall edge portion 456' and a second portion connected to the second recess wall edge portion 457', such that the strain sensor measures relative axial displacement of the first and second recess walls.

The sensor unit 450 may be attached to the first and second recess wall edge portions 456', 457' using a variety of arrangements, including, for example, adhesives, laminates, or fired glasses or ceramics, including, for example, adhesives, laminates, or fired glasses or ceramics, including direct write or additive manufacturing process providing 3D printing directly within the recess, or by embedding in resin potting, powder metal sintering, or brazing material within the recess portion.

In other embodiments, other types of sensor detectable indicia may be provided on a fitting component (e.g., on the fitting body neck) to provide reference locations on the fitting component for measurement of strain displacement. For example, other types of fitting surface discontinuities (in addition to or instead of the notches and other recesses described above) may produce sensor detectable reference locations. Examples include integral or attached protuberances, ridges, or knurled surfaces to which the sensor unit may be attached. In one example, a ridge or protuberance may be added to the outer surface of the fitting component by additive manufacturing, as known in the art. In another example, one or more of the base threads of the fitting body's threaded end portion may provide a sensor detectable surface discontinuity. Similar to the sensor unit 350 of FIGS. 15 and 15A, the sensor unit may, for example, be attached to the fitting component between the surface discontinuities, for engagement or other interaction with first and second reference locations defined by the surface discontinuities. As another example, similar to the sensor unit 450 of FIGS. 16 and 16A, the sensor unit may be adhered or otherwise attached to projecting surface discontinuities (e.g., ribs or protuberances) on the fitting component to span across a space between the surface discontinuities, providing sensor connection or other such interaction with first and second reference locations defined by the surface discontinuities.

As another example, strain displacement of visible markings on the fitting component neck may be optically detected and measured by an optical sensor. Examples of visible markings may include printed, engraved, embossed, adhered, and machined markings. The sensor unit may be secured to the fitting component over one or more such detectable markings, defining reference locations on the fitting component.

As still another example, strain displacement of materially discernible elements (i.e., of a different material than the fitting component) affixed to the fitting component may be detected and measured by an appropriate sensor. For example, strain displacement of a magnetic element affixed to the fitting component may be detected by a magnetic sensor. Other discernible materials may include, for example, magnetic, magnetizable, or conductive materials. The sensor unit may be secured to the fitting component over one or more such materially discernible elements, defining reference locations on the fitting component.

Figure 17:
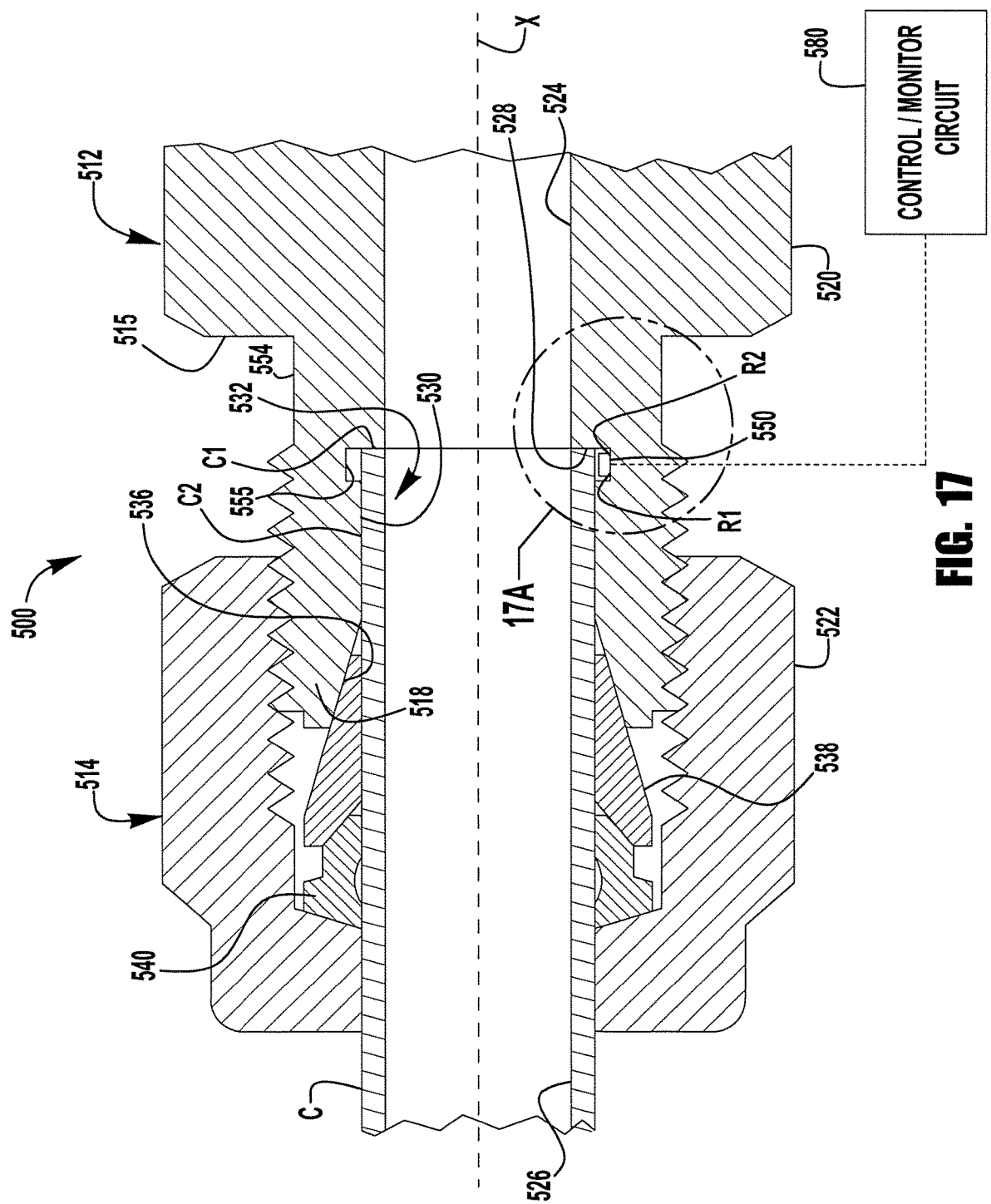
FIG. 17 is a cross-sectional view of an exemplary embodiment of a fitting assembly incorporating one or more inventions disclosed herein, shown in a finger tight condition prior to pull-up.

In another exemplary embodiment, a sensor unit may be attached to an internal wetted surface of a fitting body neck portion to measure axial strain on an internal surface of the conduit socket of the fitting body. FIGS. 17 and 17A illustrate an exemplary embodiment of the inventions, including a fitting assembly 500 that may (but need not) be consistent with the fitting assembly of FIG. 1 (and using like reference numerals accordingly), including a sensor unit 550 associated with the fitting. As shown, the sensor unit 550 may be adhered or otherwise attached to a conduit socket surface within an internal recess 555 in the fitting body neck portion 554, on first and second reference locations R1, R2, for measurement of relative axial movement of the first and second reference locations R1, R2 during pull-up of the fitting, with the relative axial movement corresponding to axial strain of the fitting body neck portion. While the sensor unit 550 may be disposed at a variety of axial locations on the inner surface of the conduit socket, in an exemplary embodiment, the recess 555 (with the received sensor unit 550) may be positioned proximate to the counterbore, consistent with the location of concentrated tensile strain in the finite element analysis of the tube bottomed fitting discussed above, and may be axially aligned with the threaded end portion 518 of the fitting body 512, or the adjacent neck portion 554. Unlike the outer radial portions of the FEA tested fitting bodies, the inner radial portions of the exemplary embodiment did not exhibit clear differences in axial strain between a pulled-up un-bottomed fitting and a finger tight fitting. However, other fitting embodiments may exhibit strain concentrations in other locations and patterns, including, for example, measurable compressive strain at the interior neck portion of a pulled-up, un-bottomed fitting body.

The sensor unit 550 may take a variety of Banns. In an exemplary embodiment, the sensor unit 550 includes a strain sensor (e.g., one or more of the exemplary strain sensors described in greater detail above). In one such example, the sensor unit 550 includes a strain gauge having a first portion connected to the first reference location R1 and a second portion connected to the second reference location R2, such that the strain gauge measures relative axial displacement of the first and second reference locations R1, R2.

The sensor unit 550 may be attached to the inner surface of the conduit socket using a variety of arrangements, including, for example, adhesives, laminates, or fired glasses or ceramics, including direct write or additive manufacturing process providing 3D printing directly within the recess, or by embedding in resin potting, powder metal sintering, or brazing material within the recess portion.

According to another aspect of the present application, the fitting assemblies 100, 200, 300, 400, 500 of FIGS. 4, 13, 15, 16, and 17 may be provided with control and monitoring systems, circuitry, or electronics 180, 280, 380, 480, 580 configured to utilize the data and information collected or obtained by the sensors. The circuitry may include a memory device to store the obtained information, and may utilize software or hardware to analyze the information to identify one or more conditions of the fitting assembly. Where a problematic or otherwise noteworthy condition (e.g. improper assembly, leakage, material fatigue, excessive pressures, temperatures, or vibration) is detected, the system may be configured to communicate a warning to an installer, user, or inspector of the system, for example, through an interface (e.g., sound, light, or display) local to the circuitry, or to an external device (e.g., computer or smart phone), for example, through a wireless or by wired connection.

The electronics 180, 280, 380, 480, 580 may be operably connected to the sensor units 150, 250, 350, 450, 550 in many different ways, including direct or indirect wired and wireless connections. Wireless connections may include electromagnetic coupling such as by antenna (e.g., RFID chip), or optical coupling, acoustic and so on. Depending on sensor precision, the sensing may be conducted both under system operating conditions (e.g., exposed to pressure, temperature, vibration, or fluid wetted conditions) and in a shutdown state. The connection may be configured to automatically initiate communication between the sensor unit and the electronics on a periodic basis, for example, for system calibration and to compare system conditions over time. The connection may additionally or alternatively be selectively activated by a user, for example, to check conditions of the fitting assembly upon initial installation, after reassembly, during system maintenance, or upon observing a problem in the fluid system. In an exemplary embodiment, the circuitry may be configured to 'filter out' measured system properties corresponding to normal installation and/or fluid system conditions, including, for example, acceptable strains, vibrations, and thermal expansion or contraction. In one example, sensor measurements (e.g., strain measurements) of a portion of a fitting (e.g., the fitting body neck portion) may be used to generate a condition curve or signature corresponding to installation, service, and/or remake of the fitting, for comparison with one or more expected condition curves or signatures corresponding to typical or proper installation, service, and/or remake of a fitting under similar conditions. This comparison may allow for filtering out of conditions corresponding to typical fitting conditions. For example, body neck strain corresponding to engagement of a stroke resisting portion (e.g., interengaging ferrule surfaces, component assembled between the ferrules, fitting body surface, fitting nut surface, or separate component assembled with the fitting body and/or fitting nut) of the fitting with a fitting component upon pull-up, as described in greater detail below, may be filtered out to better determine the bottomed or un-bottomed condition of the conduit in the installed fitting.

The specific circuits used in the electronics will be selected and designed based on the types of sensors being used. For example, a non-wetted sensor may include a strain gauge exhibiting a change in resistance, capacitance, impedance, conductivity or other detectable characteristic or condition in response to a strain condition in the fitting (e.g., at a location of the fitting to which the strain gauge is affixed). A current or voltage or other energy may be supplied to the strain gauge (e.g., from an external connected electronics package, across a wired connection or wireless connection, from a battery or other self-contained power source of the sensor unit, or from an energy harvesting circuit), with a gauge-altered return signal received from the strain gauge so as to detect the strain gauge condition of interest. Similarly, the electronics may additionally or alternatively interrogate or detect a temperature or pressure sensor condition, or the electronics may receive signals transmitted from the sensor that encode or contain the information or data of interest produced by the sensor unit. These are just a few examples of the wide and extensive variety of sensors and electronics that may be used to carry out the inventions herein.

According to another inventive aspect of the present application, an axial strain measuring sensor may be part of a sensor unit or package of one or more sensor devices generating, collecting, and/or communicating data corresponding to one or more additional properties or characteristics of the fitting assembly. The sensor 'package' may comprise a unitary, self-contained device for attachment with the fitting, or multiple, separate sensors disposed on or in the fitting that communicate with a single device (integral with or remote from the fitting) as a sensing system. The additional properties or characteristics may, but need not, relate to axial strain experienced in the fitting body. For example, as discussed above, the axial strain sensor can be used to identify at least three distinct fitting assembly conditions: (1) a fitting that has not been pulled up, (2) a fitting that has been pulled up on a bottomed tube end, and (3) a fitting that has been pulled up on an un-bottomed tube end. Additionally, depending on the level of precision of the axial strain measurements, the axial strain sensor may additionally be used to identify under-tightened and over-tightened fittings (assembled with either bottomed or un-bottomed tube ends), or fittings pulled up on partially bottomed (e.g., not squarely cut, or engaged with an axially tapered surface joined with the body socket counterbore) tube ends, based on measured incremental tensile or compressive axial strain. In still another example, in a fitting with a tube end that is in an un-bottomed but nearly bottomed condition (i.e., minimal space between the tube end and the socket counterbore), the tube end may engage the socket counterbore during pull-up, at which point the sensor would register a tube bottomed pull-up. This sensor signature, a sequential combination of un-bottomed and bottomed effects, can thus usefully provide indication of a slightly or initially un-bottomed pull-up that results in tube bottoming during pull-up.

In an exemplary embodiment, a sensor package may include multiple sensors in multiple orientations and/or in multiple locations on the fitting component, such as, for example, multiple locations around the circumference of the fitting body neck. The sensors may detect additional fitting properties which may, but need not, be related to axial strain experienced by the fitting body. In an exemplary embodiment, measurements by the sensors of multiple strain characteristics may be configured to 'filter out' measured system properties corresponding to normal fluid system conditions, including for example, any one or more of acceptable strain, vibration, thermal expansion, and pressure induces strain, to name just a few exemplary properties. In other exemplary applications, single or multiple sensors may be configured in various orientations and combinations to amplify detected strain conditions, for example, for identification of smaller changes in strain.

In an exemplary embodiment, an axially oriented strain gauge measuring axial strain in a fitting (e.g., axial strain corresponding to fitting pull-up, for example, in a bottomed or un-bottomed condition) may be provided in combination with a circumferentially or orthogonally oriented strain gauge measuring circumferential or 'hoop' strain in the fitting. In a conventional mechanically attached fitting connection, stresses that generate axial tensile strain in a portion of the fitting (e.g., a neck portion of the fitting body) produce a corresponding circumferential compressive or contractive strain in the portion of the fitting, as recognized by Poisson's ratio. Likewise, stresses that generate axial compressive strain in a portion of the fitting produce a corresponding circumferential tensile or expansive strain in the portion of the fitting. Measurement of both axial and circumferential strain at this portion of the fitting thus serves to amplify the detected strain conditions, functioning as a 'Wheatstone bridge' type amplifier, thereby facilitating detection of a strain condition indicative of a corresponding physical condition of the installed fitting. Further, the thermal effects on the axially oriented strain gauge may be at least partially negated or compensated for by the counterbalancing thermal effects on the circumferentially oriented strain gauge, taking advantage of the Wheatstone bridge effect.

Figure 18:
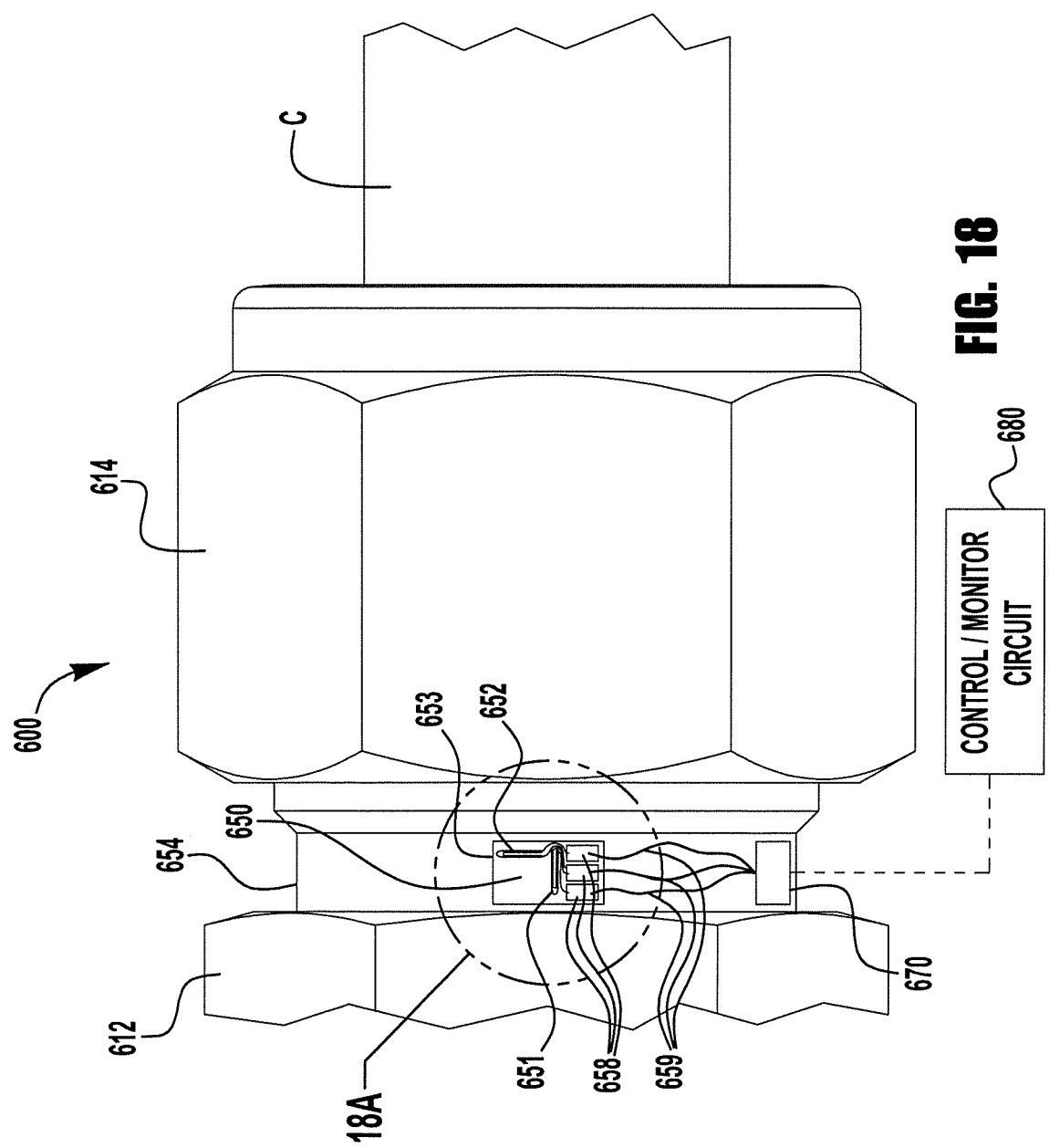
FIG. 18 is a side elevational view of an exemplary embodiment of a fitting assembly incorporating one or more inventions disclosed herein, shown in a finger tight condition prior to pull-up.
Figure 18A:
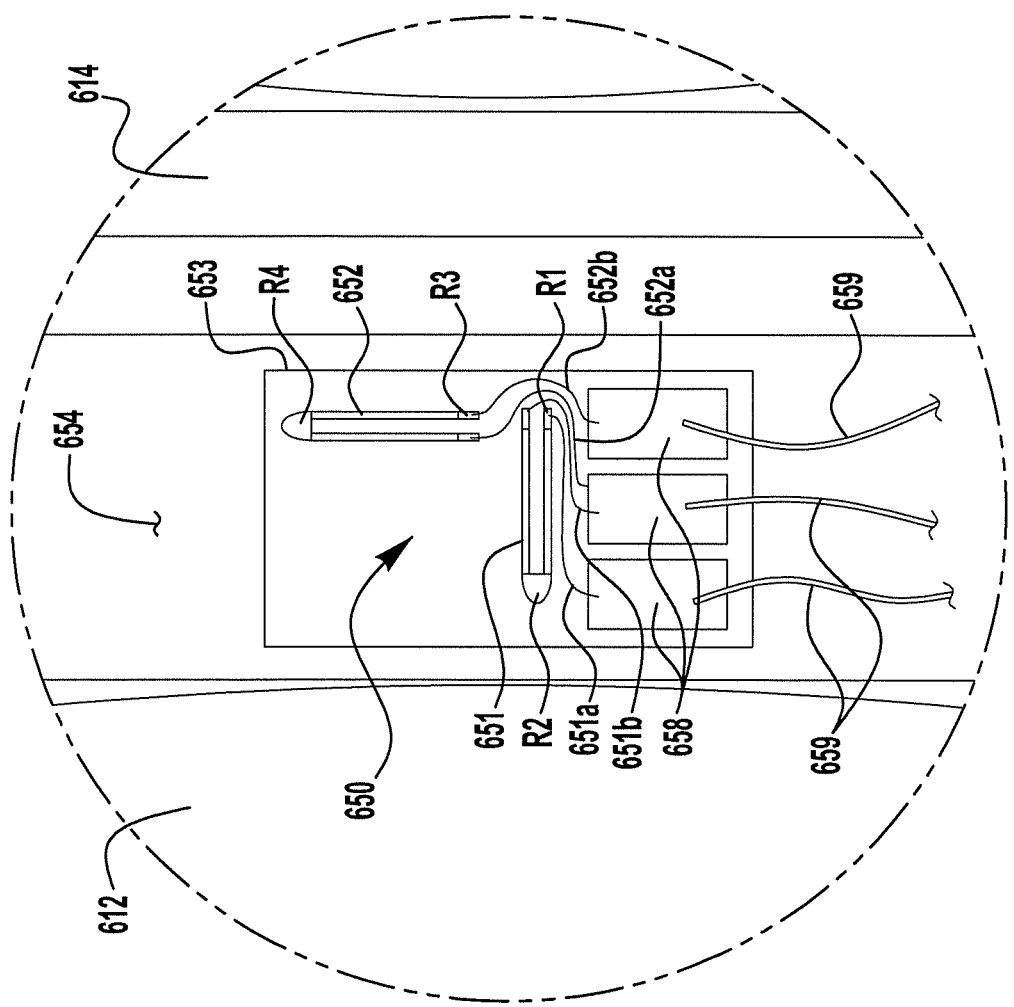
FIG. 18A is an enlarged partial view of a body neck portion of the fitting assembly of FIG. 18.

FIGS. 18 and 18A illustrate an exemplary embodiment of the inventions, including a fitting assembly 600 that may (but need not) be consistent with the fitting assembly of FIG. 1 (and using like reference numerals accordingly), including a sensor unit 650 associated with the fitting. As more clearly shown in FIG. 18A, the sensor unit 650 includes an axially oriented first strain gauge 651 and a circumferentially oriented second strain gauge 652, each adhered or otherwise attached to the fitting body neck portion 654. The first strain gauge 651 is secured between first and second axially spaced reference locations R1, R2, for measurement of relative axial movement of the first and second reference locations R1, R2 during pull-up of the fitting 600, with the relative axial movement corresponding to axial strain of the fitting body neck portion. The second strain gauge 652 is secured between third and fourth circumferentially spaced reference locations R3, R4, for measurement of relative circumferential or lateral movement of the third and fourth reference locations R3, R4 during pull-up of the fitting 600, with the relative circumferential or lateral movement corresponding to circumferential or hoop strain of the fitting body neck portion. While the strain gauges 651, 652 may be disposed at a variety of locations on the fitting body neck portion, in an exemplary embodiment, the strain gauges are affixed to a flatted surface 653 on the circumference of the fitting body neck 654, for example, to facilitate adhesion, and/or to facilitate strain measurement. In other embodiments, the strain gauges may be disposed within a recessed portion of the fitting body neck portion (e.g., a circumferential notch, as described above), for example, to protect the strain gauges from impacts and/or to amplify strain displacement of the reference locations.

While many different types of strain gauges may be utilized, the strain gauges 651,652 of the exemplary embodiment of FIGS. 18 and 18A are U-shaped semiconductor strain gauges (examples of which are manufactured and sold by Micron Instruments of Simi Valley, Calif.), providing for increased resistance (as compared to a standard "bar" style gauge) and having leads 651a, 651b, 652a, 652b extending from the same end of the gauge for connection to solder pads 658 mounted to the flatted surface 653 of the fitting body neck 654, adjacent to the gauges. Soldered to the solder pads 658 are lead wires 659 (e.g., 30 AWG insulated lead wires) providing an electrical connection from the strain gauges to a control/monitor circuit as shown schematically at 680. The lead wires 659 may provide a direct wired connection to the control/monitor circuit 680, or may be connected to a wireless transmitter, shown schematically at 670, for wireless communication with the control/monitor circuit. The wireless transmitter 670 may be part of a sensor package attached to the fitting, or may be separately attached to the fitting, or may be detached from the fitting.

Bridge signal conditioning circuitry may be provided, for example, with the transmitter 670 or with the control/monitor circuit 680 (if directly wired to the solder pads 658), to provide a stable bridge excitation voltage and to amplify and shift the bridge output voltage so it can be measured by an analog to digital converter (ADC).

Sensor unit or sensor package measurement of strain of a fitting body neck portion may additionally or alternatively be used to measure or detect other properties of the fitting corresponding to other fitting assembly, system, or maintenance related conditions. In one example, a fitting configured to experience a torque rise upon proper pull-up (beyond the torque associated with nut load on the conduit gripping device), as a result of direct or indirect axial engagement of a fitting component with a load bearing or stroke resisting portion of the fitting, produces a predictable strain in the fitting body neck portion. The stroke resisting portion may include a deformable ring, torque collar, or other such deformable surface, assembled with or integral to the fitting body or the fitting nut, or installed or disposed between the fitting nut and the fitting body. In a "body-nut based" stroke resisting embodiment, a tensile strain results from the inboard axial load on the body shoulder caused by this axial engagement and the outboard axial load on the body threads caused by threaded pull-up of the nut. The stroke resisting portion may additionally or alternatively include a deformable element, assembled between or integral to the front and/or rear ferrule. In a "ferrule based" stroke resisting embodiment, if the tube is bottomed, as the stroke resisting portion is engaged by the ferrule or ferrules, further nut advancement (in addition to effecting a sharp rise in nut torque) would impart an enlarged tensile strain axially on the outer surface of the fitting body neck. If the tube is unbottomed, further nut advancement would impart an enlarged swelling or dilation of the body threads and thus a correspondingly greater compressive strain axially on the outer surface of the fitting body neck.

The deformability of the stroke resisting portion allows for both a measurable torque rise upon fitting pull-up, and additional axial advance of the fitting and nut during fitting remake. Exemplary fittings including such stroke resisting members are described in co-pending U.S. Patent Application Publication Nos. US 2012/0005878, titled CONDUIT FITTING WITH FLEXIBLE TORQUE COLLAR (the "'878 Application"), and US 2015/0323110, titled CONDUIT FITTING WITH COMPONENTS ADAPTED FOR FITTING ASSEMBLY (the "'110 Application"), the entire disclosures of which are incorporated by reference herein.

FIG. 19 illustrates an exemplary embodiment of the inventions, including a fitting assembly 700 having a stroke resisting torque collar 760 integral with the fitting nut 714. Pull-up torque of the fitting 700 (and the resulting tensile strain of the fitting body neck portion 754) is controlled by axial compression of the torque collar 760 upon engagement with a contacting surface (e.g., outer shoulder 715) of the fitting body 712. FIG. 19 shows the fitting 700 in a pulled-up condition, in which an axial gap between the distal end 761 of the torque collar 760 and the body contacting surface 715 has been closed. This axial gap may correspond with the relative axial stroke needed between the body 712 and the nut 714 to effect an initial pull-up of the fitting 700 so that the ferrules 738, 740 grip and seal the conduit C. Once the torque collar end 761 makes contact with the body 712, further relative axial displacement (i.e. tightening) of the body 712 and the nut 714 places the torque collar 760 under axial load or axial compression. This axial load or axial compression stresses a web portion 762 of the torque collar. The web portion 762 deforms upon further fitting pull-up, such as for example by a buckling action, permitting further axial advance of the nut 712 coincident with the achievement of grip and seal of the conduit C by the ferrules 738, 740. The resistance to deformation of the torque collar web portion 762 produces the measurable rise in pull-up torque, and with it, an increase in the tensile strain in the fitting body neck portion.

Dimensioning of the torque collar, and the resulting gap between the torque collar and body contacting surface prior to pull-up, provides control of the stroke versus torque relationship during fitting pull-up, both for initial installation and for subsequent remakes, so as to reduce over-torque which can waste stroke that could otherwise be used for additional remakes. Because the contact between the torque collar end 761 and the body contacting surface 715 will cause a significant and controlled increase in pull-up torque, the fitting 700 can be pulled-up by torque (e.g., by tightening with a torque wrench until a predetermined torque value is reached) rather than by counting turns and partial turns of the nut, or in addition to counting turns and partial turns of the nut (e.g., as a second verification of proper pull-up).

Whether the fitting is pulled-up by torque or by turns, the torque collar and fitting body engagement may additionally or alternatively be used to provide a measurable increase in tensile strain in the fitting body neck portion, to provide a confirmation of proper pull-up (or alternatively, of inadequate pull-up). Accordingly, similar to the embodiments of FIGS. 4, 13, 14, 15, and 18, the fitting 700 of FIG. 14 includes a sensor unit 750 that may be attached to, secured over, or otherwise disposed on first and second reference locations R1, R2 on an outer surface of the fitting body neck portion 754 (e.g., using any of the attachment arrangements described above), for measurement of relative axial movement of the first and second reference locations R1, R2 during pull-up of the fitting, with the relative axial movement corresponding to axial strain of the fitting body neck portion indicative of torque collar engagement with the fitting body in a properly pulled-up fitting. As shown, the torque collar 760 may (but need not) cover and shield the sensor unit 750 when the fitting is pulled up. To accommodate this fully covered condition, the sensor unit 750 may include a wireless transmitter (e.g., RFID tag), as described herein, for wireless communication (e.g., through the torque collar 760) with a remote control/monitor circuit 780.

Although in the embodiment of FIG. 19 the torque collar 760 may be used for pull-up by torque of the fitting 700, and the sensor detection of tensile strain (corresponding to torque collar engagement and compression) may be used to confirm, during or subsequent to pull-up, that pull-up was completed, separately we note that the torque collar and sensor unit may be used for data signal confirmation only, without use of the torque collar 760 for pull-up by torque. A sensor unit may likewise be used with fittings having other stroke resisting, pull-up by torque arrangements, as described in the above incorporated '878 and '110 Applications, to provide a sensor initiated data signal confirmation of proper pull-up (or alternatively, of inadequate pull-up), for example, based on a measured increase in tensile strain in the fitting body neck portion, as described above. As another example, a "ferrule based" deformable stroke resisting portion, shown schematically at 765, may be disposed on or between the front and rear ferrules, to generate a measurable torque increase upon pull-up, and a corresponding tensile or compressive strain increase, as measured by the sensor unit 750. This stroke resisting portion may include an annular ring of material, for example, integral with one of the front and rear ferrules, or positioned between the front and rear ferrules. In such an arrangement, the sensor unit 750 may remain uncovered (i.e. by omitting the external torque collar) to facilitate sensor unit signal communication.

In other embodiments, a sensor unit or sensor package arrangement may additionally or alternatively be used to measure other fitting conditions. For example, a sensor unit or sensor package arrangement having a circumferentially extending strain gauge (as described and shown, for example, in the embodiment of FIGS. 18 and 18A) to measure hoop strain at the fitting body neck, corresponding to fitting nut pull-up stroke and/or internal fluid pressure. As another example, a sensor unit or sensor package arrangement may additionally or alternatively be used to measure vibration frequencies experienced in the fitting and/or in the installed tubing, or changes in vibrations consistent with the onset of tube fatigue. As yet another example, a sensor unit or sensor package arrangement may additionally or alternatively be used to measure an ultrasonic signature corresponding to system fluid flow, fitting leakage, or leakage upstream or downstream of the fitting. As still another example, a sensor unit or sensor package may additionally or alternatively be used to detect position of the fitting nut on the threaded end of the fitting body, for example, to determine an amount of pull-up of the nut on the fitting body. A sensor unit or sensor package located near the threaded end of the fitting body may be well suited to sense nut proximity. In one exemplary embodiment, a single sensor or sensor unit connected with the fitting body neck portion may be operable to measure two or more of axial strain, hoop strain, mechanical vibrations, and ultrasonic waves.

In one such exemplary embodiment, an axial strain sensor may be configured to monitor oscillations of tensile and compressive strains over time, corresponding, for example, to vibrations indicative of conduit fatigue, or to vibrations indicative of fitting leakage. As one example, an axial strain sensor may be configured to detect tensile/compressive strain oscillations at frequencies of less than 10 kHz, indicative of conduit flexure or vibration consistent with conduit fatigue. As another example, an axial strain sensor may be configured to detect tensile/compressive strain oscillations at frequencies of 40-60 kHz, indicative of fitting leakage. In other exemplary embodiments, one or more strain sensors in other orientations (e.g., a hoop strain sensor) may be configured to monitor oscillations of tensile and compressive strains over time, in some exemplary embodiments producing a stronger or amplified measurement of vibration or other such properties.

In an exemplary method for installing a fitting on a conduit, a conduit is inserted in an internal conduit socket of a fitting body having a threaded end portion and a neck portion extending rearward from the threaded end portion, with the internal conduit socket extending axially into the neck portion and terminating at a counterbore. A fitting nut is pulled up on the fitting body to grip and seal a conduit gripping device against the conduit. Oscillating relative axial displacement of at least first and second reference locations on the fitting neck portion are detected to identify at least one of conduit fatigue and system fluid leakage.

In an exemplary embodiment, a sensor carrier or substrate may be used to position a sensor or sensor unit on or within the fitting, to allow for easy installation and adaptation of a fitting with a sensing function, even for fittings that are already installed or of established design. This allows the designer to incorporate a sensing function when needed or to omit the sensing function by either not connecting to the sensor unit or simply not installing the sensor unit and sensor carrier. This allows a sensing function then to be added into a fluid system even after a non-sensing fitting has been installed, simply by installing the carrier having a desired sensing function associated therewith. The sensor unit or sensor package may be incorporated into or associated with the carrier by any number of suitable techniques, including but not limited to adhesive, painting, embedding, sputtering, metal injection molding, casting, compression, etched, printed and so on. In an exemplary embodiment, the sensor carrier comprises an RFID chip, which may store additional information about the fitting body and/or the fitting assembly, including, for example, calibrated parameters for the fitting assembly in an uninstalled or finger tight condition. Exemplary sensor carriers are described and shown in the above incorporated '404 Patent and '814 Application.

In exemplary embodiments described herein, a sensor unit or sensor package includes a signal processing device (e.g., an RFID chip) for communication of the strain related data and/or other measured data to a remote network or a system user, wirelessly or otherwise. The signal processing device may include a resonant circuit (e.g., formed from capacitive, inductive, and/or conductive materials) with a response frequency indicative of strain and/or other measured data. The signal processing device may also store additional information to be communicated with the measured data, including for example, a fitting identifier or serial number, fitting component (e.g., body, nut, ferrule, or tube section) identifier or serial number, fitting part number, manufacturer information, or date of installation. The device could be battery energized (e.g., by a self-contained battery), energized by electrical, thermal, or mechanical energy sources in or about the fitting installation (e.g., using an energy harvesting circuit), or could remain passive until energized wirelessly (e.g., through a wireless RF connection with an active RFID antenna), or through internal energy harvesting technology. Energy usage may be minimized by limiting sensing and/or communication to periodic monitoring events or selective user activation. Additionally or alternatively, the signal could be read directly through a hard wire connection to a signal processing unit.

According to another inventive aspect of the present application, a sensing function associated with a fitting may be external to the fitting, such that no component assembled with or connected to the fitting electronically communicates sensed conditions of the fitting, but instead an external user or device senses, measures, or otherwise identifies an externally measurable condition of the fitting that corresponds to a condition of axial strain in the fitting body neck portion. For example, indicia visible on the outer surface of the fitting body neck portion may be optically monitored using an optical scanning device that can sense minor deviations or distortions in the indicia that correspond to axial tensile or compressive strain of the portions of the fitting body neck portion on which the indicia are disposed. As one example, a smart phone or other handheld device with an appropriate image processing application may be used to optically evaluate the indicia. As another example, a laser based measuring device may be used, such as, for example, a dual laser system using a dual frequency induced interference fringe pattern for microstrain measurement resolution (e.g., under 50 microstrain resolution). The indicia may include, for example, notches, laser engraved elements, or printed patterns, to name a few examples.

In still another example, in some embodiments an axial displacement amplifying notch, as described in greater detail above, may be inspected using an insertable inspection gauge that may fit within the notch when the notch has experienced tensile strain corresponding to pull-up of the fitting on a bottomed tube end. Depending on the expected dimensional variances in the notch, the inspection gauge may be provided with contact sensors to amplify the precision of the notch width measurement.

In an exemplary aspect of the present application, a strain responsive coating or component may be applied to the neck portion of the fitting body, for external evaluation of an axial and/or hoop strain condition (e.g., by external measurement of a characteristic, such as a magnetic field or surface conductance, or by user visual inspection, or by optical evaluation of the coating characteristics using a smart phone or other handheld electronic device). Examples of strain-responsive coatings include a visually responsive nano-tube based 'strain paint,' developed at Rice University, a polymeric binder and luminescent dye based strain responsive coating (e.g., 'Strain Sensitive Skin,' manufactured by Visteon Corp. in Sterling Heights, Mich.), or coatings that produce magnetic fields that vary in response to changes in surface strain.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A fitting for a fluid conduit having a longitudinal axis to make a mechanically attached end connection therewith, comprising:
   a coupling body comprising a threaded end portion, a neck portion extending axially rearward from the threaded end portion, and an internal conduit socket extending axially rearward into the neck portion and terminating at a counterbore;

a coupling nut comprising a threaded portion for mating threaded engagement with the threaded end portion of the coupling body;

a conduit gripping device that is axially driven by the coupling body and the coupling nut to provide grip and seal against a conduit installed in the conduit socket and bottomed against the counterbore after the fitting is pulled-up; and a strain sensor unit disposed on the neck portion of the coupling body, the strain sensor unit including at least a first axially extending strain sensor positioned and oriented for strain sensor unit measurement of a first strain of the neck portion corresponding with a first fitting assembly condition, and a second strain of the neck portion corresponding with a second fitting assembly condition different from the first fitting assembly condition;

wherein a first portion of the strain sensor unit is attached to a first indicium on the neck portion at a first axial position, and a second portion of the strain sensor unit is attached to a second indicium on the neck portion at a second axial position, such that the first strain sensor measures axial strain corresponding to axial movement of the second indicium with respect to the first indicium;

wherein the neck portion of the coupling body includes a recessed portion having first and second axially spaced wall portions, with the first wall portion defining the first indicium and the second wall portion defining the second indicium; and wherein the first strain sensor is attached to an outer surface of the coupling body neck portion to span across the recessed portion, with an outer edge of the first wall portion defining the first indicium and an outer edge of the second wall portion defining the second indicium.

2. The fitting of claim 1, wherein the first and second strains comprise first and second axial strains.

3. The fitting of claim 2, wherein the first axial strain comprises a tensile strain and the second axial strain comprises a compressive strain.

4. The fitting of claim 1, wherein the first strain sensor is disposed on an outer radial surface of the neck portion.

5. The fitting of claim 1, wherein the strain sensor unit further comprises a second strain sensor.

6. The fitting of claim 5, wherein the second strain sensor has a different orientation than the first strain sensor.

7. The fitting of claim 1, wherein the first strain sensor is positioned radially outward of the conduit socket.

8. The fitting of claim 1, wherein the first strain sensor is positioned axially rearward of the counterbore.

9. The fitting of claim 1, wherein the coupling body further comprises an outer shoulder, the neck portion extending axially between the outer shoulder and the threaded end portion, wherein the strain sensor is axially proximate to the threaded end portion and axially distal to the outer shoulder.

10. The fitting of claim 1, wherein the strain sensor unit measures the first and second strains by varying an oscillator frequency of an RFID transmitter connected with the first strain sensor, and transmitting a data signal at the varied oscillator frequency.

11. The fitting of claim 1, wherein the first fitting assembly condition comprises pull-up of the fitting with a conduit installed in the conduit socket in a bottomed condition, and the second fitting assembly condition comprises pull-up of the fitting with a conduit installed in the conduit socket in an un-bottomed condition.

12. The fitting of claim 1, wherein the first fitting assembly condition comprises pull-up of the fitting sufficient to effect grip and seal of the conduit gripping device against a conduit installed in the conduit socket, and the second fitting assembly condition comprises insufficient pull-up of the fitting with the installed conduit.

13. The fitting of claim 1, wherein the strain sensor unit further comprises a signal processing device connected with the first strain sensor for receiving strain dependent electrical signals from the first strain sensor and generating corresponding axial strain data.

14. The fitting of claim 13, wherein the signal processing device is configured to communicate with a control/monitoring device operable to evaluate the measured axial strain data and to identify whether the fitting is in the first fitting assembly condition or the second fitting assembly condition.

* * * * *